US008699882B2

(12) United States Patent
Shieh

(10) Patent No.: US 8,699,882 B2
(45) Date of Patent: Apr. 15, 2014

(54) SIGNAL METHOD AND APPARATUS

(75) Inventor: William Shieh, Glen Waverley (AU)

(73) Assignee: Ofidium Pty Ltd, Melbourne, Victoria (AU)

( * ) Notice: Subject to any disclaimer, the term of this patent is extended or adjusted under 35 U.S.C. 154(b) by 614 days.

(21) Appl. No.: 12/684,018

(22) Filed: Jan. 7, 2010

(65) Prior Publication Data

US 2010/0178057 A1 Jul. 15, 2010

Related U.S. Application Data

(60) Provisional application No. 61/143,356, filed on Jan. 8, 2009.

(51) Int. Cl.
*H04J 14/00* (2006.01)

(52) U.S. Cl.
USPC .............................. 398/76; 398/79; 398/152

(58) Field of Classification Search
USPC ...................................... 398/76–79, 152–153
See application file for complete search history.

(56) References Cited

U.S. PATENT DOCUMENTS

| 6,542,460 | B1* | 4/2003 | Ring ............................. 370/203 |
| 7,327,913 | B2 | 2/2008 | Shpantzer et al. |
| 7,397,979 | B2 | 7/2008 | Shpantzer et al. |
| 7,860,406 | B2* | 12/2010 | Xie ............................... 398/205 |
| 2007/0133918 | A1 | 6/2007 | Cho et al. |
| 2007/0140613 | A1 | 6/2007 | Achiam et al. |
| 2007/0183308 | A1* | 8/2007 | Korobkov et al. ............ 370/208 |
| 2008/0159758 | A1 | 7/2008 | Shpantzer et al. |
| 2009/0067833 | A1* | 3/2009 | Bunge et al. .................... 398/43 |
| 2010/0034542 | A1* | 2/2010 | Armstrong .................... 398/158 |
| 2010/0166102 | A1* | 7/2010 | Seyedi-Esfahani ........... 375/295 |
| 2010/0329384 | A1* | 12/2010 | Kwak et al. ................... 375/295 |
| 2011/0211541 | A1* | 9/2011 | Yuk et al. ...................... 370/329 |

OTHER PUBLICATIONS

Shieh, W. et al., "Coherent Optical OFDM: Theory and Design," Optics Express, Jan. 21, 2008, vol. 16, No. 2, pp. 841-859.
Shieh, W., et al., "Coherent Optical Orthogonal Frequency Division Multiplexing," Electronics Letters, May 11, 2006, vol. 42, No. 10, 2 pages.
Shieh, W. et al., "Theoretical and Experimental Study on PMD-supported transmission using polarization diversity in coherent optical OFDM systems," Optics Express, Aug. 6, 2007, vol. 15, No. 16, pp. 9936-9947.
Shieh, W., et al., "107 Gb/s coherent optical OFDM transmission over 1000-km SSMF fiber using orthogonal band multiplexing," Optics Express, Apr. 28, 2008, vol. 16, No. 9, pp. 6378-6386.

* cited by examiner

*Primary Examiner* — Dzung Tran

(74) *Attorney, Agent, or Firm* — Baker & Hostetler LLP

(57) ABSTRACT

Methods and apparatus for generating and processing a signal are disclosed. The signal may comprise a plurality of mutually orthogonal subcarriers constituting a plurality of bands. The signal may be either an optical or a radio frequency signal.

15 Claims, 21 Drawing Sheets

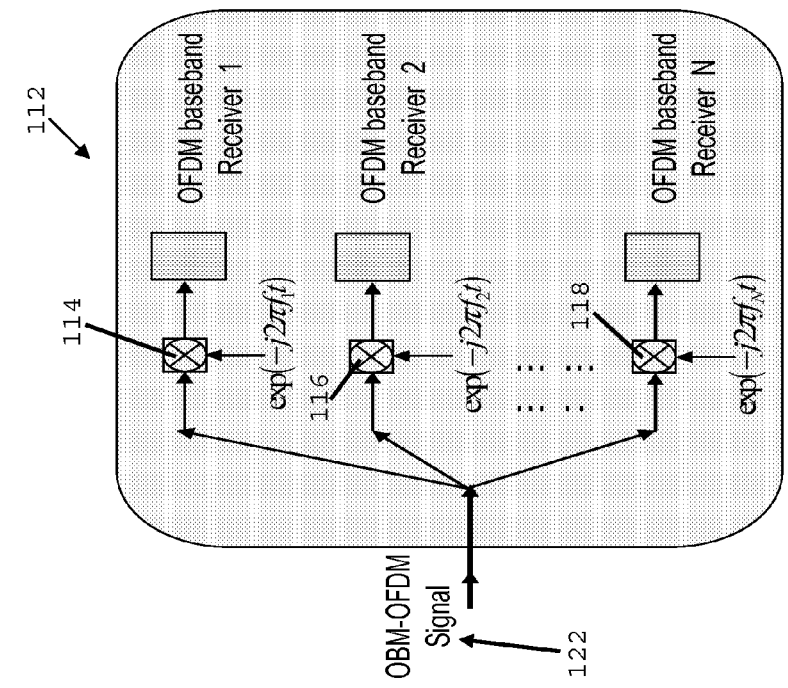
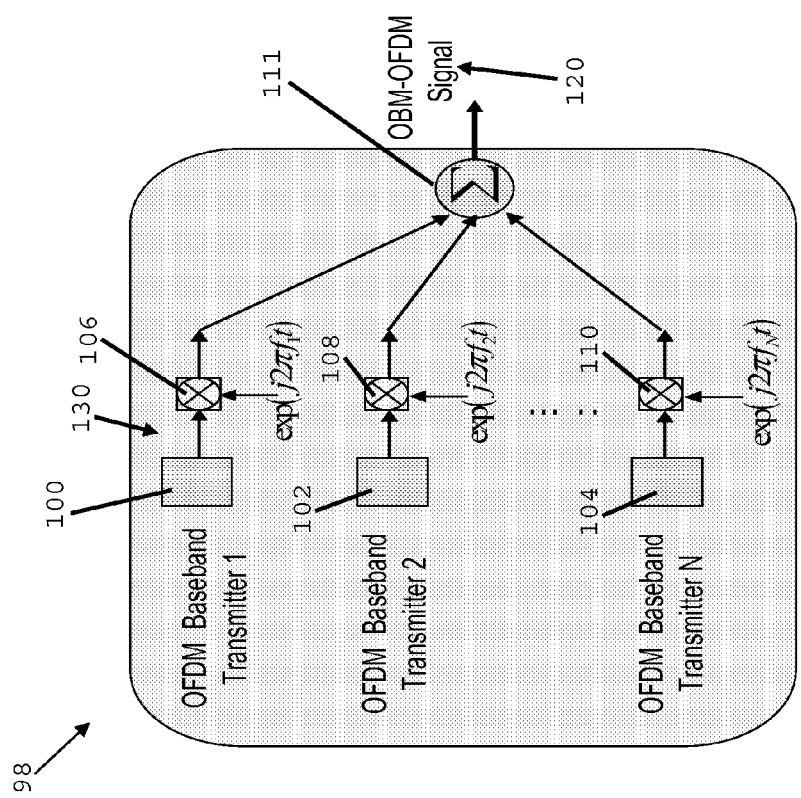
Figure 6
Figure 5

S/P: Serial-to-parallel  GI: Guard Time Insertion  (I)DFT: (Inverse) Digital Fourier Transform
D/A: Digital-to-Analog

SIGNAL METHOD AND APPARATUS

FIELD OF THE INVENTION

The present invention generally relates to the generation, transmission and detection of orthogonal frequency division multiplexed signals, and particularly but not exclusively to optical orthogonal frequency division multiplexed signals having orthogonal bands.

BACKGROUND OF THE INVENTION

Optical Frequency Division Multiplexing (OFDM) is a radio frequency format described, for example, by S. Hara and R. Prasad in *Multicarrier Techniques for 4G Mobile Communications* (Artech House, Boston, 2003). Any two subcarriers are orthogonal provided the difference in their frequency is given by $m/T_s$ where m is an integer and $T_s$ is symbol period. The symbol rate is the inverse of the symbol period. That is, the orthogonal subcarrier sets can be recovered with a correlator matched to the subcarrier without inter-carrier interference, in spite of strong signal spectral overlap. Radio frequency OFDM signals have some desirable properties including tolerance to dispersion and multipath interference. Optical Orthogonal Frequency Division Multiplexing (O-OFDM), where an optical tone carries an OFDM signal, has shown extreme robustness to fiber chromatic dispersion and polarization mode dispersion (PMD), and has the additional advantage of achieving high spectral efficiency using higher-order modulation enabling dynamic data rate adaptation.

Even with bandwidth efficient direct-conversion architecture in the transmitter and receiver, however, the electrical bandwidth required for fast OFDM or especially O-OFDM, is currently challenging to achieve. A 107 Gb/s O-OFDM signal would still require about 15 GHz of bandwidth. The best commercial Digital to Analogue Convert (DAC) and Analogue to Digital Convert (ADC) in a silicon integrated circuit (IC) has a bandwidth of around 6 GHz, indicating that it would be challenging to realize fast O-OFDM in a cost-effective manner.

SUMMARY OF INVENTION

Some embodiments of the present invention generally provide a method of generating a signal, the method comprising the step of generating a plurality of mutually orthogonal subcarriers constituting a plurality of bands. The signal may be an OFDM or O-OFDM signal or a variant of either of these. Typically, the plurality of bands are generated from one or more data streams. Each of the bands may have a smaller bandwidth than the signal. The signal is, in an embodiment, transmitted and exhibits at least some desirable transmission qualities. In some embodiments, there is also generally provided a method comprising the step of processing the signal. Processing the signal may comprise detection of the signal after its transmission.

Advantageously, in at least one embodiment, electronics such as DACs and ADCs having a bandwidth comparable with the bands rather than the bandwidth of the signal can be used for generating and processing the signal, which ameliorates the technical and economic problems associated with using electronics fast enough for processing the whole signal. The above mentioned advantages are especially manifest for O-OFDM signals which are desirably fast and may be at or near the limits of technical and economic feasibility. It may be possible to achieve the generation, transmission and detection of an O-OFDM signal having bands that is faster than any achievable O-OFDM signal having a single band.

According to a first aspect of the invention there is provided a method comprising:

generating a plurality of baseband signals each comprising a plurality of subcarriers spaced apart by a subcarrier spacing frequency equal to an integer multiple of a symbol rate of the baseband signals; and up-converting each of the baseband signals to a respective up-converted signal, the up-converted signals being spaced apart by the, or another, integer multiple of the symbol rate.

In an embodiment, the method comprises the preliminary step of receiving an input signal, and each of the plurality of baseband signals are generated from the input signal.

In an embodiment, the method further comprises combining the up-converted signals.

In an embodiment, up-converting each of the baseband signals comprises up-converting each of the baseband signals to a respective radio-frequency band signal.

Advantageously, the spacing between the subcarriers and bands ensures the orthogonality of the combined up-converted signals while still allowing band-by-band processing.

In an embodiment, the up-converted signals are spaced apart by an integer multiple of the subcarrier spacing frequency. The space between the up-converted signals may comprise guard bands. The integer multiple may be either 1 or greater than 1.

In an embodiment, the method further comprises modulating a light with the radio frequency band signals. The light may comprise light from a laser. The light may be launched into an optical transmission line. The optical transmission line may comprise an optical fibre. The modulated light may be a wavelength division multiplexed (WDM) channel.

In an embodiment, the plurality of baseband signals are generated from a data stream. The plurality of baseband signals may by generated from no more than one data stream.

In an embodiment the plurality of baseband signals may be generated from a plurality of data streams. Each data stream may originate from a respective port. Each port may be a router port, for example. Information from one of the data streams may be used to generate more than one of the baseband signals. There is not necessarily a one-to-one correspondence between the data streams and basebands.

In an alternative embodiment, each of the baseband signals is generated from a respective data stream. Each data stream may originate from a respective port.

Some embodiments have the advantage of generating an optical channel from a plurality of data streams, which reduces the number of optical channel generators used. This may be one or more of: more economic; convenient; and compact than using a plurality of optical channel generators.

In an embodiment, the method further comprises filtering one or more of the plurality of baseband signals to prevent aliasing. The method may comprise filtering each of the plurality of baseband signals.

In an embodiment the, or the another, integer multiple is either 1 or greater than 1.

In an embodiment, the up-converted signals are located symmetrically around a frequency of 0.

In one embodiment, the method comprises:

generating the plurality of baseband signals each comprising the plurality of subcarriers spaced apart by a subcarrier spacing frequency equal to an integer multiple of a symbol rate of the baseband signals;

up-converting each of the baseband signals to the respective radio-frequency band signal, the radio frequency band signals being spaced apart by the, or another, integer multiple of the symbol rate; and combining the radio frequency band signals.

According to a second aspect of the invention there is provided an apparatus comprising:

a baseband generator arranged to generate a plurality of baseband signals, each baseband signal comprising a plurality of subcarriers spaced apart by a subcarrier spacing frequency equal to an integer multiple of a symbol rate of the baseband signals; and an up-converter in communication with the baseband generator, the up-converter being arranged to up-convert each baseband signal to a respective up-converted signal, the unconverted signals being spaced apart by the, or another, integer multiple of the symbol rate.

In an embodiment, the apparatus comprises an input arranged to receive an input signal in communication with the baseband generator, and the baseband generator is arranged to generate the plurality of baseband signals from the received input signal.

In an embodiment, the baseband generator may be in communication with a data stream source.

In an embodiment, the apparatus also comprises a combiner arranged to combine the up-converted signals. The combiner may comprise one or more multiplexes. The combiner may comprise one or more couplers.

In an embodiment, the up-converted signals each comprise a radio frequency band signal. The radio frequency band signals may be spaced apart by the, or another, integer multiple of the symbol rates.

In an embodiment, the apparatus further comprises a modulator for modulating a light with the radio frequency band signals. The modulator may be in communication with the combiner. The modulator may comprise an optical up-converter. The optical up-converter may comprise an IQ modulator.

In an embodiment, the apparatus may comprise a baseband transmitter in communication with the baseband generator. The baseband transmitter may be a plurality of baseband transmitters. The baseband transmitter and baseband emitter may be the same unit.

In an embodiment, the baseband generator is a plurality of baseband generators, each generator being arranged to generate a respective one of the baseband signals.

In an embodiment, each baseband is directly up converted to a respective optical carrier. This may be done using one or more optical I/Q modulators, or two Mach-Zehnder modulators. The modulators may be nested. In this case, the optical carriers may be uniformly spaced to multiple of the symbol rates to satisfy the orthogonal band multiplexing condition.

In an embodiment, the baseband directly modulates multiple light sources. Up conversion to the RF domain is skipped.

In an embodiment, up-conversion is implemented digitally. Combination of multiple bands may be implemented digitally. This may be done using a DFT synthesis filter bank. This may comprise a DFT filter. This may comprise a polyphase filter. The DFT and polyphase filters may be combined.

In an embodiment, each generator may be paired with a respective one of the transmitters. They may be part of the same unit.

In an embodiment, the up-converter is a plurality of up-converters. Each up converter may be in communication with a respective one of the baseband transmitters and/or generators. Each up-converter may be arranged to up-convert a respective one of the baseband signals to a respective radio-frequency band signal, the radio frequency band signals being spaced apart by the, or another, integer multiple of the symbol rates.

In an embodiment, each of the baseband transmitters and/or generators comprise an OFDM transmitter and/or generator.

In an embodiment, each of the up-converters comprise an IQ modulator.

In an embodiment, the apparatus comprises:

the plurality of baseband transmitters each being arranged to generate the respective baseband signal, each baseband signal comprising the plurality of subcarriers spaced apart by a subcarrier spacing frequency equal to an integer multiple of a symbol rate of the baseband signals;

the plurality of up-converters each in communication with the respective one of the baseband transmitters, each up-converter being arranged to up-convert the respective one of the baseband signals to the respective radio-frequency band signal, the radio frequency band signals being spaced apart by the, or another, integer multiple of the symbol rates; and the combiner arranged to combine the radio-frequency band signals.

According to a third aspect of the invention there is provided a method comprising:

receiving a plurality of mutually orthogonal subcarriers constituting a plurality of bands;

down-converting one or more of the bands to a respective baseband signal; and processing the one or more baseband signals.

In an embodiment, each of the bands are down-converted to a respective baseband signal. Each of the baseband signals may be processed.

In an embodiment, each band comprises a radio frequency band signal.

In an embodiment, the plurality of mutually orthogonal subcarriers (or indeed bands) are substantially simultaneously received.

In an embodiment, a guard band may separate the bands.

In an embodiment, processing each of the baseband signals comprises processing each of the baseband signals as for an OFDM baseband signal.

In an embodiment, the method comprises reconstructing a data stream using information from each of the processed baseband signals.

In an embodiment, the method comprises the preliminary step of receiving a plurality of mutually orthogonal optical subcarriers constituting a plurality of optical frequency band signals. The method may comprise generating each of the radio frequency band signals by down-converting a respective one of the optical frequency band signals. Generating each of the radio frequency bands may comprise coherent detection.

In an embodiment, coherent detection comprises mixing the plurality of optical subcarriers with a laser light having a frequency at the center of one of the radio frequency bands.

In an embodiment, coherent detection comprises mixing the plurality of optical subcarriers with a laser light having a frequency midway between adjacent radio frequency bands.

In an embodiment, the method comprises:

receiving the plurality of mutually orthogonal subcarriers constituting the plurality of radio frequency band signals;

down-converting each of the radio frequency band signals to a respective baseband signal; and processing each of the baseband signals.

In an embodiment, the optical signal is directly down-converted to baseband. Down conversion to the RF domain is skipped.

In an embodiment, down conversion is implemented digitally.

According to a fourth aspect of the invention there is provided an apparatus arranged for processing a signal comprising a plurality of mutually orthogonal subcarriers constituting a plurality of bands, the apparatus comprising:

a down-converter arranged to down-convert one or more of the plurality of bands to respective baseband signals; and a processing module arranged to process each of the one or more baseband signals.

In an embodiment, the down-converter is arranged to down-convert each of the plurality of bands to respective baseband signals. The processing module may be arranged to process each of the baseband signals.

In an embodiment, the apparatus further comprises a data stream reconstructor arranged to reconstruct a data stream using information from each of the processed baseband signals.

In an embodiment, the apparatus also comprises a receiver for receiving the signal.

In an embodiment, the signals comprise radio frequency band signals.

In an embodiment, the down-converter is a plurality of down-converters, each down-converter being arranged to down-convert a respective one of the plurality of mutually orthogonal radio frequency band signals to a respective baseband signal. Each of the down-converters may comprise an IQ demodulator. Each processor may comprises an OFDM baseband receiver.

In an embodiment, the processor comprises a plurality of processors. Each down-converter may be in communication with a respective one of a plurality of processors arranged to process the respective baseband signal.

In an embodiment, each of the signals comprise a plurality of mutually orthogonal subcarriers. The mutually orthogonal radio frequency bands may be spaced apart by an integer multiple of a symbol rate of the bands.

In an embodiment, the apparatus further comprises an optical-to-radio frequency down-convertor. The down-converter may be arranged to receive at least one of the optical frequency band signals. The down-converter may be arranged to down-convert at least one of the optical frequency band signals to a respective one of the radio frequency band signals. The optical-to-radio frequency down-convertor may comprise a coherent detector. The apparatus may comprise a plurality of optical-to-radio frequency down-convertors.

In an embodiment, the apparatus further comprises a combiner to combine the output of the processors. The combiner may output a data stream. The combiner may output only one data stream.

In an embodiment, the apparatus further comprises a splitter. The splitter may be arranged to receive the radio frequency band signals and communicate each of them to the respective down converter. The splitter may be in communication with the optical-to-radio frequency down-convertor. The splitter may comprise one or more multiplexes. The splitter may comprise one or more couplers.

In an embodiment, information contained in the plurality of baseband signals may constitute a single data stream.

In an embodiment, the apparatus comprises:

the plurality of down-converters, each down-converter being arranged to down-convert the respective one of the plurality of mutually orthogonal radio frequency band signals to the respective baseband signal, each of the radio frequency band signals comprising a plurality of mutually orthogonal subcarriers, each down converter being in communication with the respective one of the plurality of processors arranged to process the respective baseband signal.

BRIEF DESCRIPTION OF THE FIGURES

In order to achieve a better understanding of the nature of the present invention embodiments will now be described, by way of example only, with reference to the accompanying figures in which:

FIGS. 5 and 6 show embodiments of OBM-OFDM implementations for the transmitter and the receiver respectively;

DETAILED DESCRIPTION OF EMBODIMENTS OF THE INVENTION

In one embodiment a signal comprising a plurality of mutually orthogonal subcarriers constituting a plurality of bands is generated, transmitted, and then processed at a receiver. Each band is generated separately using relatively slow electronics and then the bands are combined to form a fast signal. As a result, the electronics and especially DAC/ADCs in the apparatus do not need to operate at an extremely high sampling rate. The DAC/ADCs only require a bandwidth approximately equal to each OFDM band, which is approximately the signals original bandwidth divided by the number bands. When the signal is an OFDM signal, dividing the OFDM spectrum into multiple orthogonal bands is called by the applicant 'orthogonal-band-multiplexed OFDM' (OBM-OFDM). The OFDM bands can be multiplexed and de-multiplexed without inter-band interference because they are orthogonal.

The subcarriers are mutually orthogonal provided, for example, that they are spaced apart in frequency by an integer multiple of the symbol rate of the bands ("the subcarrier spacing frequency"). The spacing need not be the same across the entire signal spectrum. The bands are orthogonal provided they are also spaced apart by an integer multiple of the symbol rate. Again, the spacing need not be the same across the entire signal spectrum. In some embodiments the bands are spaced apart by an integer multiple of the subcarrier frequency spacing providing a guard band between adjacent bands.

Figure 1:
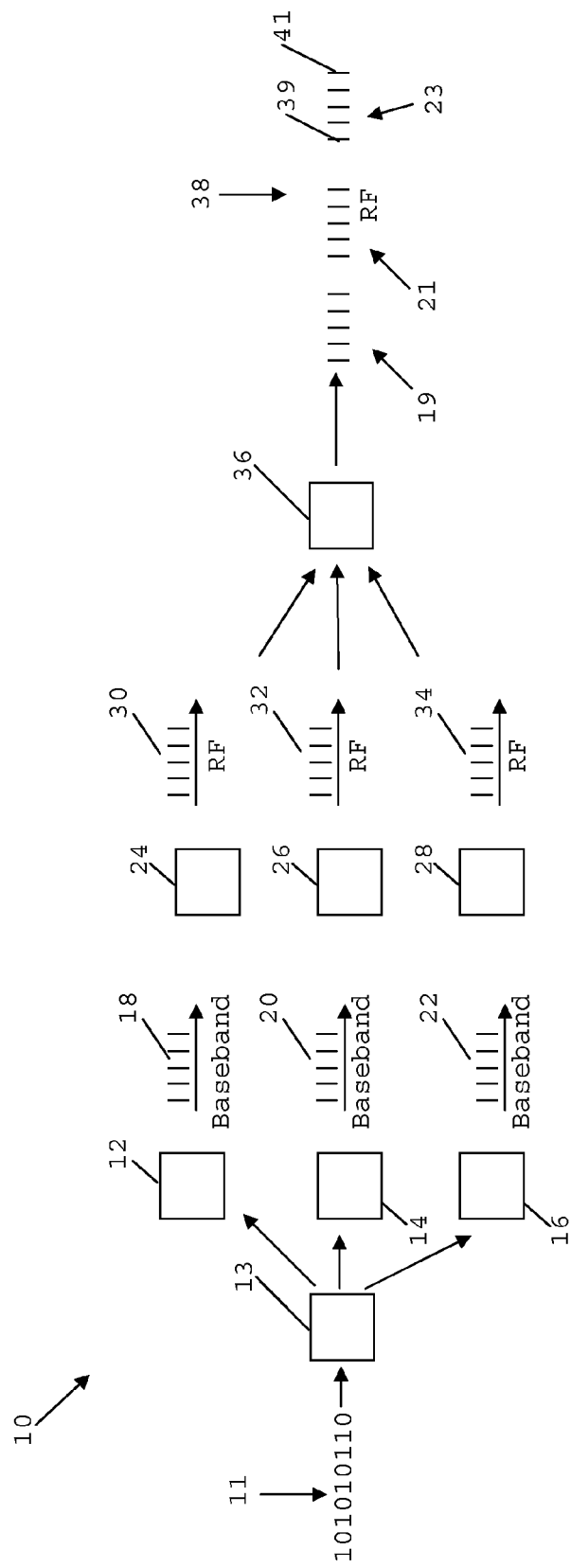
FIG. 1 shows a block diagram of an embodiment of a transmitter.

FIG. 1 shows one embodiment of a transmitter apparatus generally being indicated by the numeral 10. The apparatus generates a radio frequency (RF) signal 38 from a data stream 11. The signal comprises a plurality of mutually orthogonal subcarriers, such as 39, 41, constituting a plurality of radio frequency band signals 19, 21, 23. In this embodiment, the apparatus has an input 13 in communication with the baseband generators, which receives an input signal 11 conveying the data stream.

It will be understood that the plurality of baseband signals may alternatively be generated from a plurality of data streams. This would have the advantage of further decreasing the speed of the required electronics. For example, a 100 Gbit/s signal may be generated from many slower signals, such as 10 Gbit/s signals. In one embodiment, the O-OFDM apparatus is interfaced to a router having 10 ports each of 10 Gbit/s rather than a single port of 100 Gbit/s. This is particularly useful at higher optical signal speeds of 200 Gbit/s and above.

Each data stream may be mixed or split into more than one of the bands to achieve efficient use of the available bandwidth for example.

The transmitter 10 has a plurality of baseband generators 12, 14, 16 that generate respective baseband signals 18, 20, 22. In this embodiment, the baseband generators comprise respective baseband transmitters. Each baseband transmitter/generator is in communication with a respective up-converter 24, 26, 28 which up-convert the baseband signals to radio frequency (RF) band signals 30, 32, 34. The RF bands are then combined using a combiner 36 to form a signal 38 comprising all of the RF band signals 30, 32 and 38. The RF band signals are transmitted simultaneously.

Figure 2:
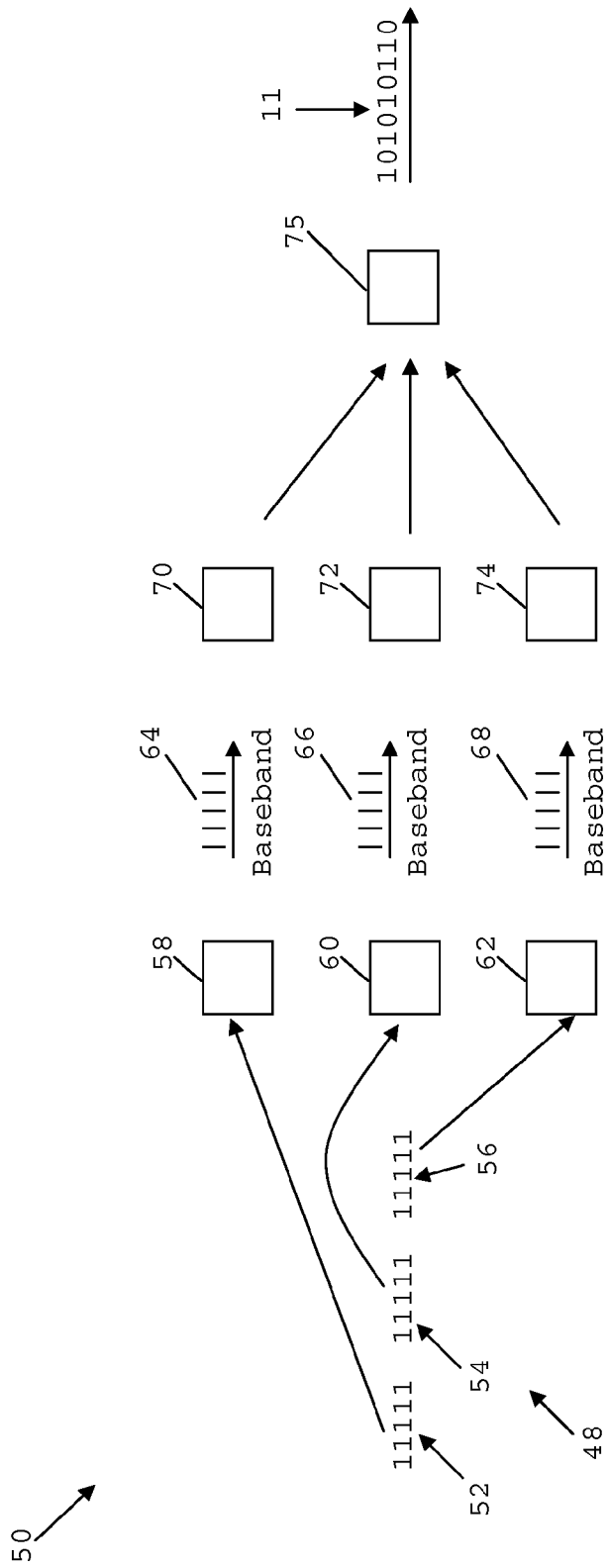
FIG. 2 shows a block diagram of an embodiment of a receiver.

FIG. 2 shows an embodiment of a receiving apparatus generally indicated by numeral 50 for processing a radio frequency signal 48 comprising a plurality of mutually orthogonal subcarriers constituting a plurality of radio frequency band signals 52, 54, 56. Each band is processed separately using relatively slow electronics. The receiving apparatus has down-converters 58, 60, 62, each arranged to down-convert one of the RF band signals 52, 54, 56 to a respective baseband signal 64, 66, 68. Each down-converter communicates a baseband signal 64, 66, 68 to a respective processor (or processing module) 70, 72, 74 arranged to process baseband signals. In this embodiment, the processors 70, 72, 74 are OFDM baseband receivers. The data stream 11 is then reconstructed from the output of the processors by further processing. In this embodiment, the data stream is reconstructed using information from each of the processed baseband signals by a data stream reconstructor 75.

In examples where the radio frequency signals are generated from a plurality of data streams, the data streams may be reconstructed at the receive end, rather than combined to form a single data stream.

In some cases all the information required is contained within a single radio frequency band such as 52. In this case, the apparatus 50 shown in FIG. 2 only requires down-converter 58 and processor 70. The down-converters 60 and 62, the processors 72 and 74 and the data stream reconstructor 75 may not be included in another embodiment of the apparatus in this case. In other cases, the required information may be contained in several bands, but not in all the bands. The number of down-converters and processors may be selected appropriately in this case. The apparatus may comprise appropriate one or more filters to pick out the required bands. Each filter may be located in front of a respective down-converter and configured to pass a respective band only.

Figure 3:
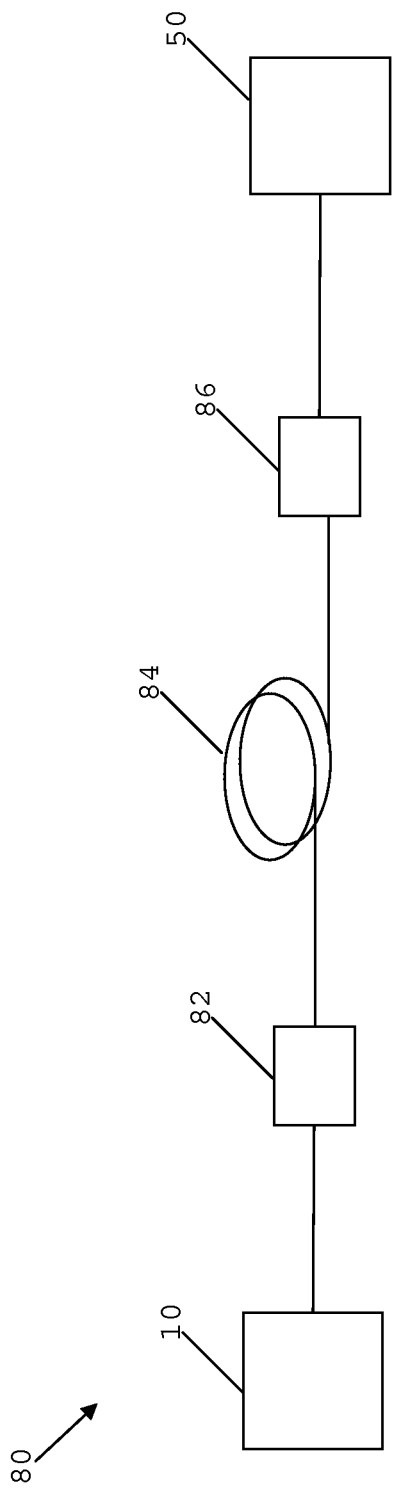
FIG. 3 shows a block diagram of an embodiment of an optical transmission system.

FIG. 3 shows a block diagram of one embodiment of an optical transmission system, generally indicated by the numeral 80 employing the transmitter of FIG. 1 and receiver of FIG. 2. The output of the transmitter 10 is up-converted to optical frequencies by an RF-to-optical up-converter 82 and the light launched into an optical fibre 84 for transmission. At the receive end the light is received then processed by an optical-to RF down-converter 86 which sends the retrieved signal into the receiver 50.

It will be appreciated that the multiple O-OFDM signals may be launched into fibre 84, for example, each signal having a different centre frequency. Thus, a wavelength Division Multiplexed (WDM) transmission system having multiple WDM channels is achieved, each WDM channel having O-OFDM type modulation. In one example of this type of system, a plurality of sets of transmission 10/up-converter 82 pairs are run, their respective centre frequencies lying on an ITU frequency grid in one of the bands such as the C-band. The optical outputs from each pair can be combined using an array waveguide grating (AWG), for example. An AWG may also be used to demultiplex at the receive end, where there is a plurality of down-converter 86/receiver 50 pairs. In a system like this, while the subcarriers within one WDM channel are orthogonal, they need not be between WDM channels because of the effective multiplexing/demultiplexing achieved by the AWGs.

Figure 4:
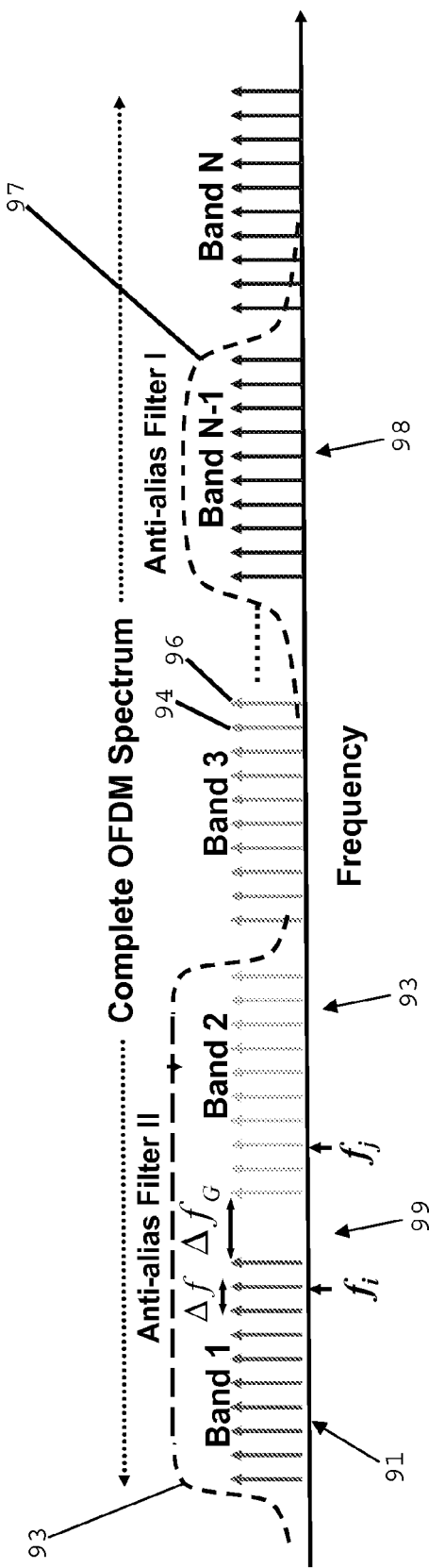
FIG. 4 shows a conceptual diagram of one example of orthogonal-band-multiplexed OFDM signal.

The structure of the signals will now be discussed in more detail. OBM-OFDM divides the entire OFDM spectrum into multiple orthogonal OFDM (sub) bands. As shown in the example of FIG. 4, the entire OFDM spectrum comprises N OFDM bands, each with the subcarrier spacing frequency of Δf (the spacing between subcarriers 94 and 96), and band frequency guard spacing of $\Delta f_G$. The space spanned by $\Delta f_G$ is a guard band. The subcarrier spacing Δf is identical for each band due to using the same sampling clock within one circuit. In this example, the orthogonal condition between the different bands is given by $$\Delta f_G = m \Delta f \quad (1)$$

that is, the guard band width is an integer multiple (m times) of the subcarrier spacing. In other embodiments, however, the guard band width in an integer multiple of the subcarrier frequency spacing. As such, the orthogonality condition is satisfied not only for the subcarriers inside each band, but it is also satisfied for any two subcarriers from different bands, for instance, $f_i$ from band 1 and $f_j$ from band 2 are orthogonal to each other, despite the fact that they originate from different bands. The interesting scenario is that m equals to 1 in (1) such that the OFDM bands can be multiplexed/de-multiplexed even without a guard band. Another desirable value of m is 2 (minimal guard band).

Upon reception, each band can be de-multiplexed using an anti-alias filter slightly wider than the bands to be detected. FIG. 1 shows two approaches for OBM-OFDM detections. The first approach is to tune a receiver laser to the center of each band (such as band N-1), and use an anti-alias filter I 97 that low-pass only one-band RF signal 98, such that each band is detected separately. The second-approach is to tune the receive laser to the center of the guard band 99 (such as $\Delta f_G$), and use an anti-alias filter II 93 that low-passes a two-bands such that two bands 91, 93 are detected simultaneously. In either case, the inter-band interference is avoided because of the orthogonality between bands, despite the 'leakage' of the subcarriers from neighboring bands.

Figure 7:
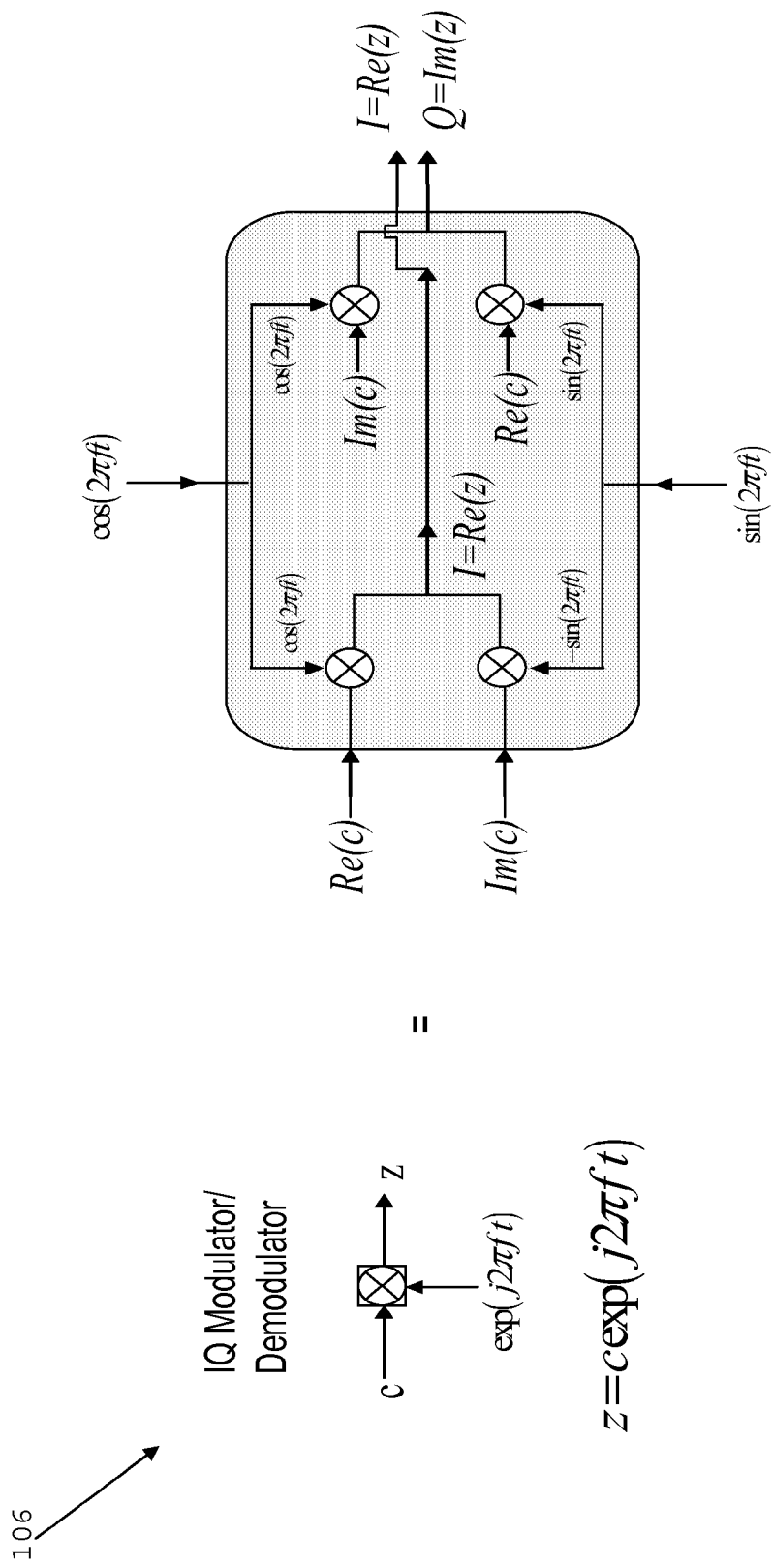
FIG. 7 shows an embodiment, in schematic form, of an IQ modulator/demodulator.

FIGS. 5 to 7 show conceptual diagrams for embodiments of mixed-signal circuits for implementing OBM-OFDM. FIG. 5 shows one embodiment of a transmitter generally indicated by the numeral 98. In FIG. 5, each of the plurality of OFDM baseband transmitters 100, 102, 104 is implemented, in this embodiment, using a digital integrated circuit. The subsequent up-conversion, band-filtering and RF amplification can be implemented in RF IC design. The baseband signal output such as 130 from each of the OFDM baseband transmitters 100-104 may be filtered through an anti-alias filter (not shown but may be placed between each transmitter/up-converter pair) and up-converted to an appropriate RF band signal with the center frequency from $f_1$ to $f_N$ using a respective IQ modulator 106, 108, 110 or a complex multiplexer. The structure of an example IQ modulator is shown in FIG. 7. The output from each of the IQ modulators 106-110 is then combined in a combiner 111 to form the signal 120 having multiple orthogonal bands.

In this embodiment, the band center frequencies $f_1$ to $f_N$ are centered around zero, and given by $$f_l = l \cdot \Delta f_b, \ l \in [-L, L] \quad (2)$$

where $f_l$ is the center frequency of the lth OFDM band, $\Delta f_b$ is the band spacing, L is the maximum of the band number.

The output of each IQ modulator 106-110 is a complex value that has real and imaginary parts as shown in FIG. 7. These complex signals are further summed up at the output, namely, real and imaginary parts are added up in separate parallel paths. The combined complex OFDM signal will be used to drive an optical IQ modulator to up-convert to the optical domain. The negative and positive bands differ only in the sign of quadrature oscillator 'sin(2πft)', and subsequently can be combined and implemented with one complex multiplexer by the same up conversion frequency. However, the baseband input ports need simple modifications to include the two bands that are of mirror-image with each other.

FIG. 6 shows one embodiment of a receiver generally indicated by the numeral 112. The incoming signal 122 is split into multiple bands and down-converted to baseband signal using IQ demodulators 114-118. Anti-alias filters may be used to remove unwanted high frequency components at the output of the demodulators. Again similar to the transmitter 98, the negative and positive bands can be either down-converted separately using a separate complex mixer, or using the same mixer which separates positive and negative bands. It follows that the DAC/ADCs only need to operate at the bandwidth of each OFDM band. For instance, if the number of sub bands is five, each OFDM band will only need to cover about 7 GHz bandwidth for 107 Gb/s data rate with QPSK modulation and polarization multiplexing. The electrical bandwidth required is 3.5 GHz, or half of the OFDM band spectrum by using direct-conversion at transmit and receive. ADC/DACs with bandwidth of 3.5 GHz can be implemented using today's technology. Using a wider bandwidth for each OFDM band will reduce the number of the OFDM bands further down, in this example, to two or three. It is also noted that the number of transmitter bands and receiver bands do not necessarily need to be same, as they are in FIGS. 5 and 6.

Using OBM-OFDM, we have transmitted a 107 Gb/s O-OFDM signal through 1000-km (10×100 km) of standard-single-mode-fiber (SSMF) using only a erbium doped fibre amplifier without amplification achieving a Q factor of 11.5 dB, without optical dispersion compensation and without a need for a polarization controller at the receiver. We also were able to use relatively slow DAC/ADCs. We now present the details of this demonstration.

Figure 8:
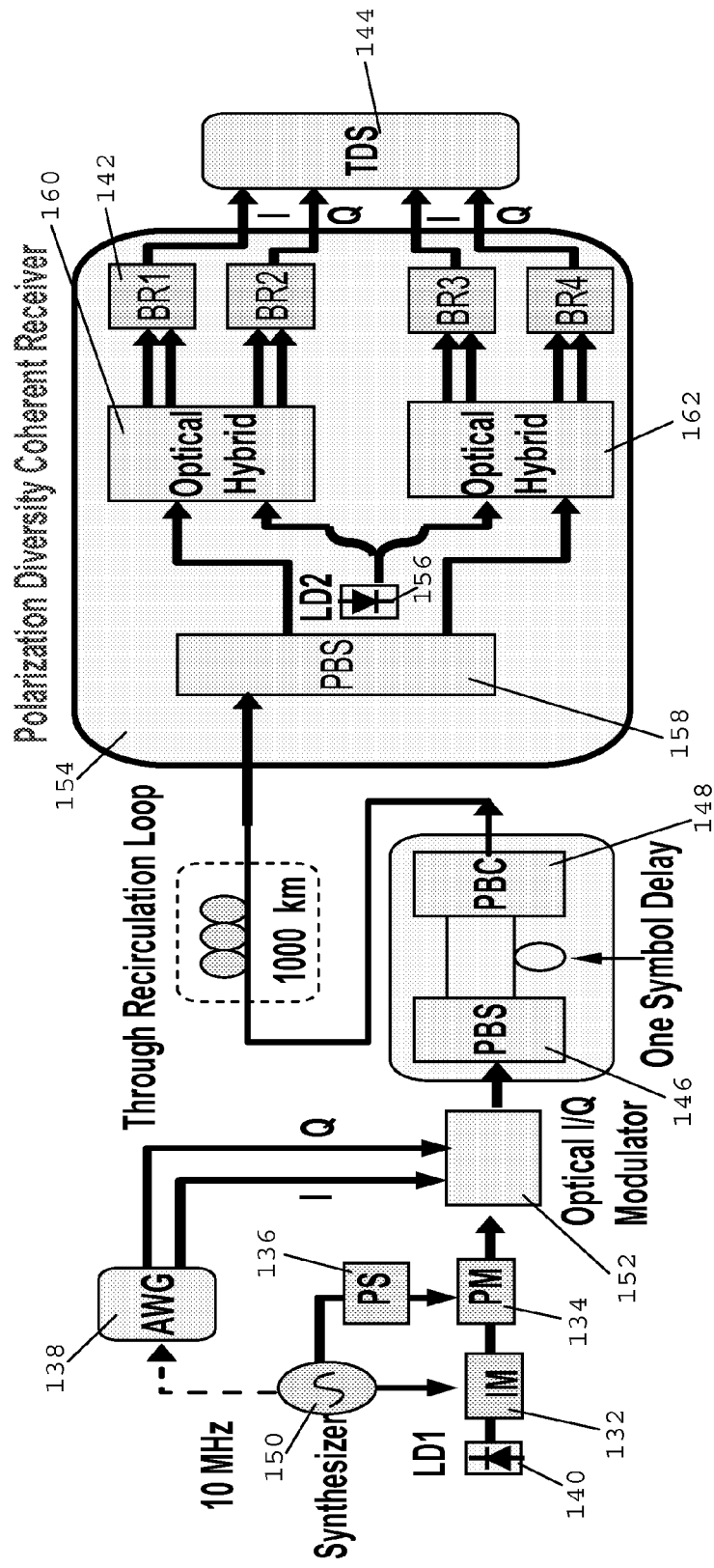
FIG. 8 shows an example apparatus used to demonstrate transmission of a 107 Gb/s O-OFDM signal.

Optical OFDM can be realized using either subcarrier multiplexing or wavelength multiplexing to combine multiple orthogonal bands into a complete OFDM spectrum as shown in FIG. 4. The transmission performances such as OSNR sensitivity, nonlinearity, and phase noise impact are independent of the means of constructing the signal. The future implementations will be in the form of electronic mixed signal ICs as shown in FIGS. 5 to 7. To demonstrate the principle of the technique, however, we used optical multiplexing without prejudicing the demonstration. FIG. 8 shows the experimental setup used for the demonstration which includes an Intensity Modulator (IM) 132, a Phase modulator (PM) 134, a Phase Shifter (PS) 136, an Arbitrary Waveform Generator (AWG) 138, Laser Diodes (LD) such as 140 and 156, Balanced Receivers (BR) such as 142, a Time-Domain Sampling Scope (TDS) 144 and Polarization Splitters/Combiners (PBS/C) such as 146 and 148 respectively. Five optical tones spaced apart by 7.5 GHz are generated using an intensity modulator cascaded with a phase modulator as disclosed in Wang et al, European Conference on Optical Communication (ECOC) '03, Paper Th3.2.4, Rimini, Italy, September 2003. The tone spacing and arbitrary waveform generator 138 sampling clock are locked by a frequency standard of 10 MHz from the synthesizer 150. The OFDM signal in each individual band is generated by using a Tektronix Arbitrary Waveform Generator 138. The time domain OFDM waveform is first generated with a Matlab program with the parameters as follows: total number of subcarriers is 128, guard interval is ⅛ of the observation period, middle 87 subcarriers out of 128 are filled, from which 10 pilot subcarriers are used for phase estimation. The real and imaginary parts of the OFDM waveforms are uploaded into the AWG 138 operated at 10 GS/s to generate two analog signals, which are then fed into I and Q ports of an optical I/Q modulator 152, to impress the baseband OFDM signal onto the five optical tones. The optical output of the I/Q modulator consists of five OBM-OFDM radio frequency band signals, each band carrying 10.7 Gb/s. Although the five bands are filled with the same data, this will not affect the performance of the system studied and our subsequent conclusion. The Q penalty difference between different and the same data filing the bands should be less than 0.4 dB. No dispersion compensation module is used in our transmission experiment, leading to fast phase walk-off and de-correlation between neighboring bands. Conventional transmission uses dispersion compensation.

Figures 9, 10:
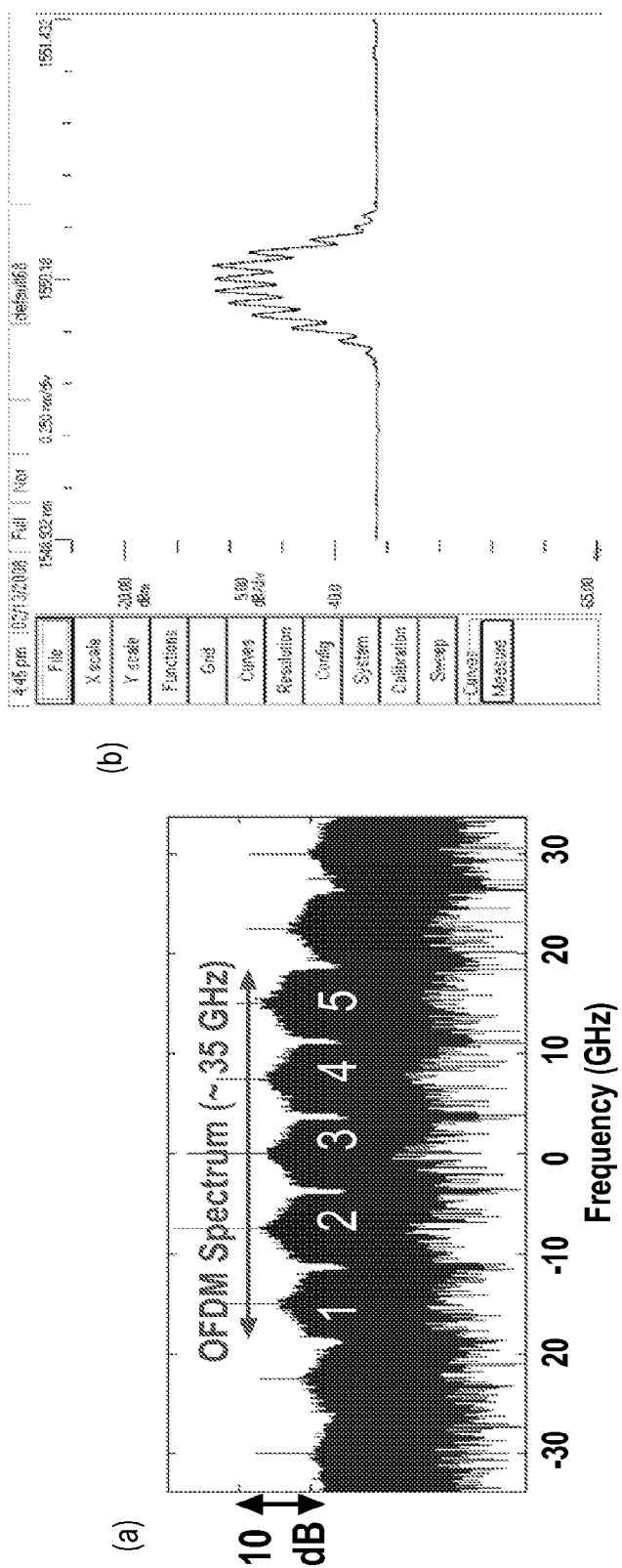
FIGS. 9 and 10 show example optical spectra for a signal transmitted through the apparatus of FIG. 8 using a polarization diversity optical receiver and optical spectrum analyzer respectively.

The optical OFDM signal from the I/Q modulator 152 is split into two branches that are delay-mismatched by one OFDM symbol period (14.4 ns), and then combined. This is to emulate the polarization diversity transmitter with data rate of 21.4 Gb/s per band. The two polarization components are completely independent due to the delay of 14.4 ns for each OFDM symbol. The signal is further input into a recirculation loop comprising 100-km fiber and an erbium doped fiber amplifier (EDFA) to compensate for loss. The signal is coupled out of the loop and received with a polarization diversity coherent receiver 154, comprising a receive laser 156, a polarization beam splitter 158, two hybrids 160, 162 and four balanced receivers, 142 for example as disclosed in S. L. Jansen et al, European Conference on Optical Communications, paper PD1.3, Berlin, Germany (2007). The receive laser 156 is tuned to the center of each band, and the RF signals from the four balanced detectors first pass through the 'alias filters I' with a low pass bandwidth of 3.8 GHz, such that each band is measured independently (this is the first approach with 21.4 Gb/s per detection described earlier. The occupies about 35 GHz and roll off rapidly at the edge. The out-band components are due to the multi-frequency source generation not tightly bounded at 5 tones. This artifact will not be present for a deployed system using either subcarrier multiplexing or optical multiplexing OBM-OFDM. FIG. 10 shows the 'zoom-out' optical spectrum using an optical spectrum analyzer. The resolution of FIGS. 6 and 7 are 100 kHz and 2.5 GHz respectively.

Figure 11:
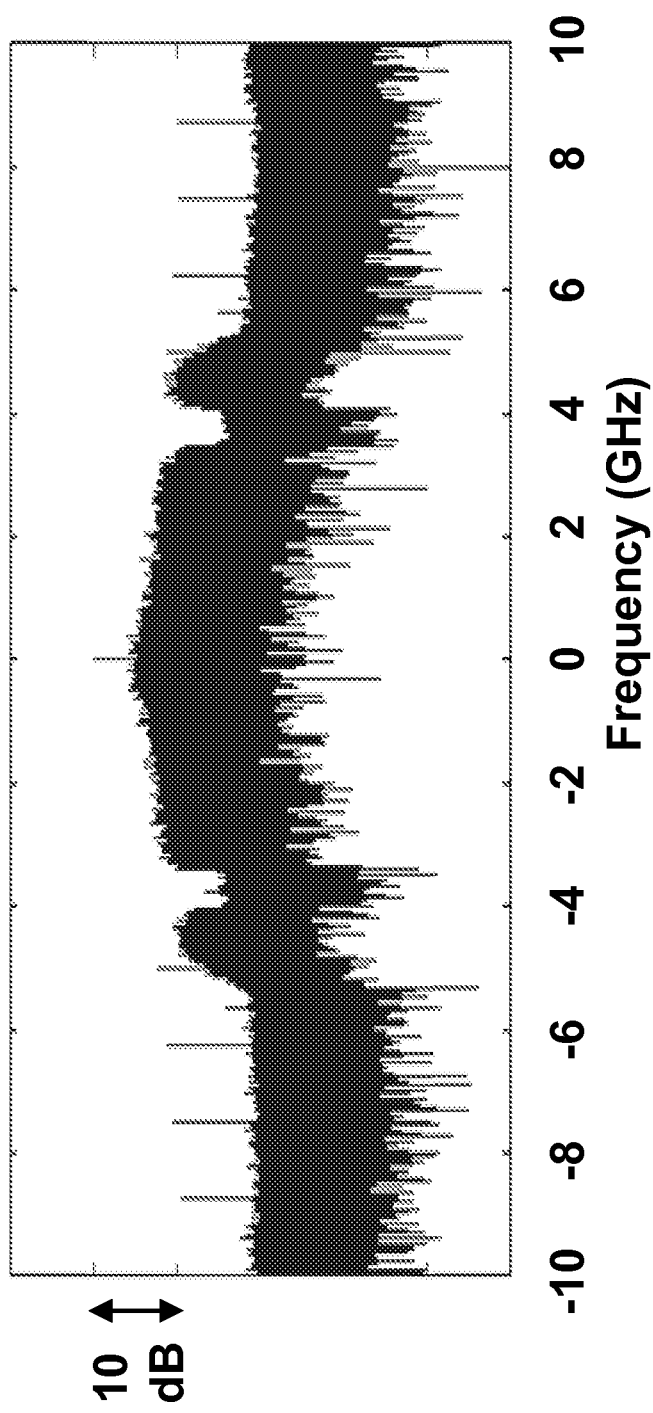
FIG. 11 shows one example electrical spectrum from the receiver of FIG. 3 after a 3.8 GHz anti-alias filter, the negative and positive frequencies showing due to coherent detection.

FIG. 11 shows the detected electrical spectrum after using a 3.8 GHz electrical anti-alias filter. This is equivalent to placing a 7.6 GHz optical band-pass filter centered around each OFDM band. As is shown in FIG. 9, without electrical anti-alias filter, the electrical spectrum may be as broad as 15 GHz (which is the photodetector bandwidth). Such a broad spectrum will have alias effect if sampled at 20 GS/s, indicating that at least 30 GS/s ADC is preferably used. However, the filtered spectrum in FIG. 11 can be sampled at 20 GS/s, or even at a lower speed of 10 GS/s. Additionally, despite the fact that there are some spurious components from one or more neighboring bands leaked from the edges of the 3.5 GHz filter, since the subcarriers are orthogonal they do not contribute to the interference degradation.

Tables 1(a) and 1(b) show the performance of five bands for both back-to-back and after 1000 km of transmission. It can be seen that both polarizations in each band can be recovered successfully, and this is done without a need for a polarization controller at the receiver. At a reach of 1000 km, all the band BERs are better than $10^{-3}$. The difference of BER in each entry is attributed to the tone power imbalance and instability as well as the receiver imbalance for two polarizations.

TABLE 1

BER distribution for OFDM sub-bands, when (a) OSNR of 17.5 dB at back-to-back, and (b) OSNR of 20.2 dB after 1000 km transmission.

|     |                    | Band 1 | Band 2 | Band 3 | Band 4 | Band 5 |
|-----|--------------------|--------|--------|--------|--------|--------|
| (a) | BER (x polarization) | $9.8 \times 10^{-4}$ | $1.2 \times 10^{-4}$ | $1.3 \times 10^{-5}$ | $4 \times 10^{-5}$ | $8.2 \times 10^{-4}$ |
|     | BER (y polarization) | $2.1 \times 10^{-3}$ | $1.2 \times 10^{-4}$ | $2.7 \times 10^{-5}$ | $1.3 \times 10^{-5}$ | $1.3 \times 10^{-3}$ |
| (b) | BER (x polarization) | $4.1 \times 10^{-4}$ | $4.5 \times 10^{-4}$ | $9.6 \times 10^{-5}$ | $1.4 \times 10^{-5}$ | $7.8 \times 10^{-4}$ |
|     | BER (y polarization) | $6.8 \times 10^{-5}$ | $1.2 \times 10^{-4}$ | $4.2 \times 10^{-4}$ | $4.2 \times 10^{-4}$ | $7.1 \times 10^{-4}$ |

RF signals are then input into the Tektronix Time Domain-sampling Scope 144, acquired at 20 GS/s, and processed with a Matlab program using 2×2 MIMO-OFDM models. MIMO-OFDM processing is discussed in W. Shieh, workshop 5, European Conference on Optical Communications, Berlin, Germany (2007) and S. L. Jansen et al, European Conference on Optical Communications, paper PD1.3, Berlin, Germany (2007). The 2×2 MIMO-OFDM signal processing involves FFT window synchronization using Schmidl format to identify the start of the OFDM symbol, software estimation and compensation of the frequency offset, channel estimation in terms of Jones Matrix H, phase estimation for each OFDM symbol, and constellation construction for each carrier and BER computation. The channel matrix H is estimated by sending 30 OFDM symbols using alternative polarization launch. The total number of OFDM symbols evaluated is 1000. The measurements of low BER, of the order of $10^{-5}$, are run multiple times.

Figure 12:
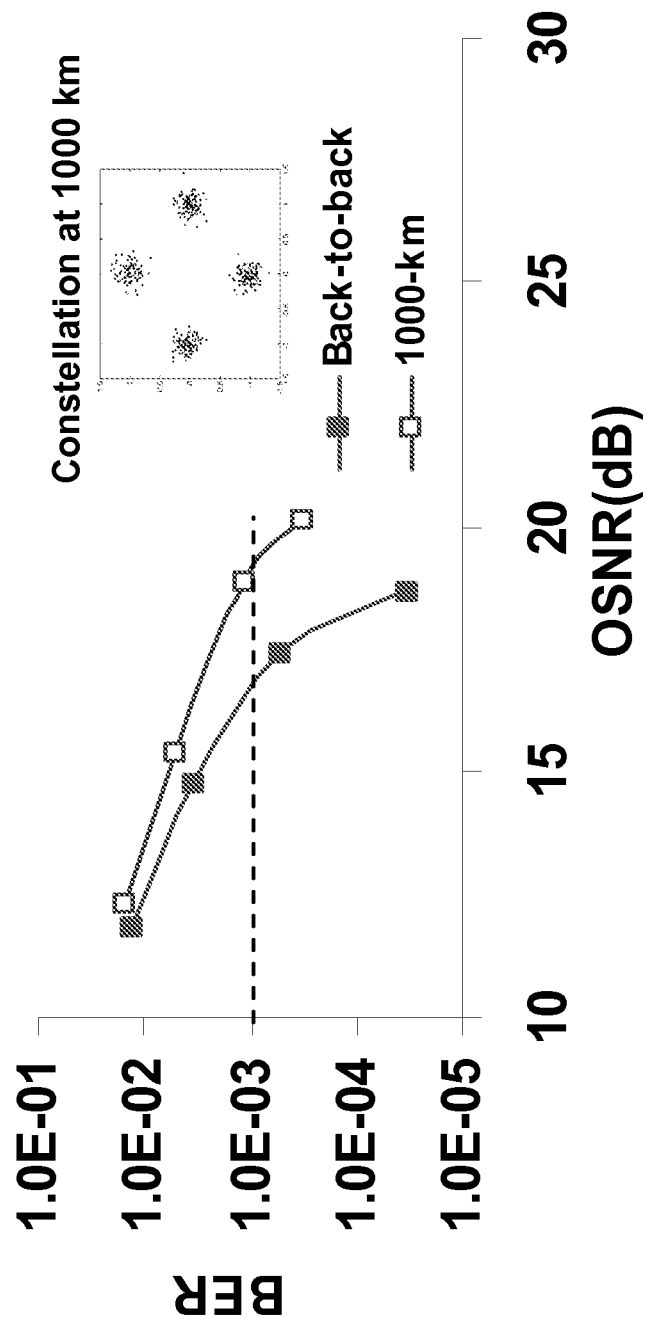
FIG. 12 shows an example of measured Bit Error Rate (BER) sensitivity of the 107 Gb/s signal for back-to-back and 1000 km transmission.
Figure 13:
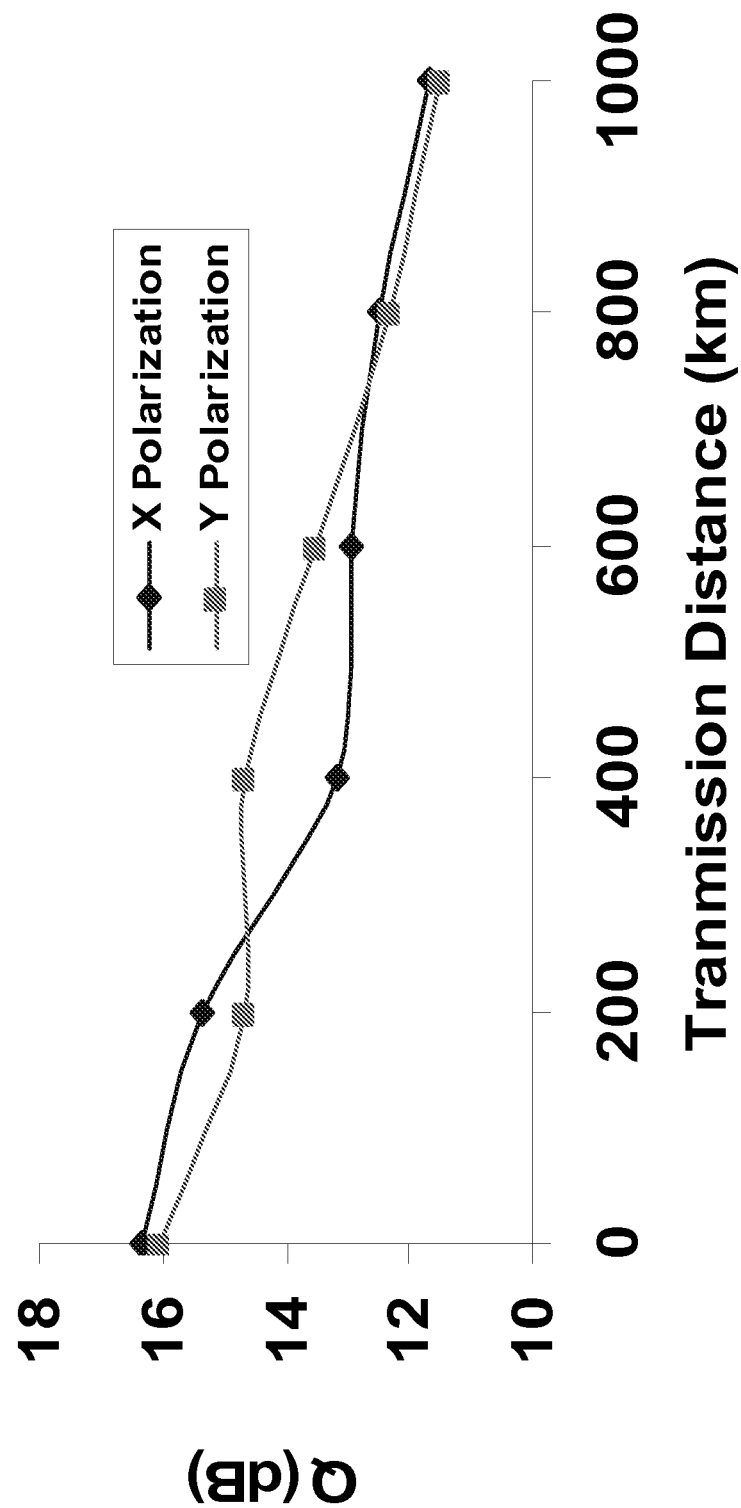
FIG. 13 shows an example of measured Q factor for the 107 Gb/s signal as a function of transmission distance.

FIG. 9 shows the optical spectrum after 1000-km of transmission measured with the polarization diversity coherent receiver shown in FIG. 5. It can be seen that the optical spectrum has five OFDM bands spaced at 7.5 GHz with guard bands of about 625 MHz (m=8). The entire OFDM spectrum FIG. 12 shows the BER sensitivity performance for the entire 107 Gb/s O-OFDM signal at the back-to-back and 1000-km transmission with the launch power of −1 dBm. The BER is accounted across all five bands and two polarizations. The inset shows the clear constellation at 1000 km and OSNR of 20.2 dB. The OSNR required for a BER of $10^{-3}$ is respectively 17.0 dB, and 19.2 dB for back-to-back and 1000-km transmission. FIG. 13 shows the system Q performance of the 107 Gb/s O-OFDM signal as a function of reach up to 1000 km. The optimal launch power for all reaches is around −1 dBm. It can be seen that the Q decreases from 16 dB to 11.5 dB when the reach increases from back-to-back to 1000 km. The Q disparity between two polarizations is attributed to the polarization diversity detector imbalance. We note that this is the first 107 Gb/s transmission over 1000 km SSMF fiber without using optical dispersion compensation modules and without Raman amplification, in either single-carrier or multi-carrier format, to the best of our knowledge.

Demonstration of 1 Tb/s

Figure 14:
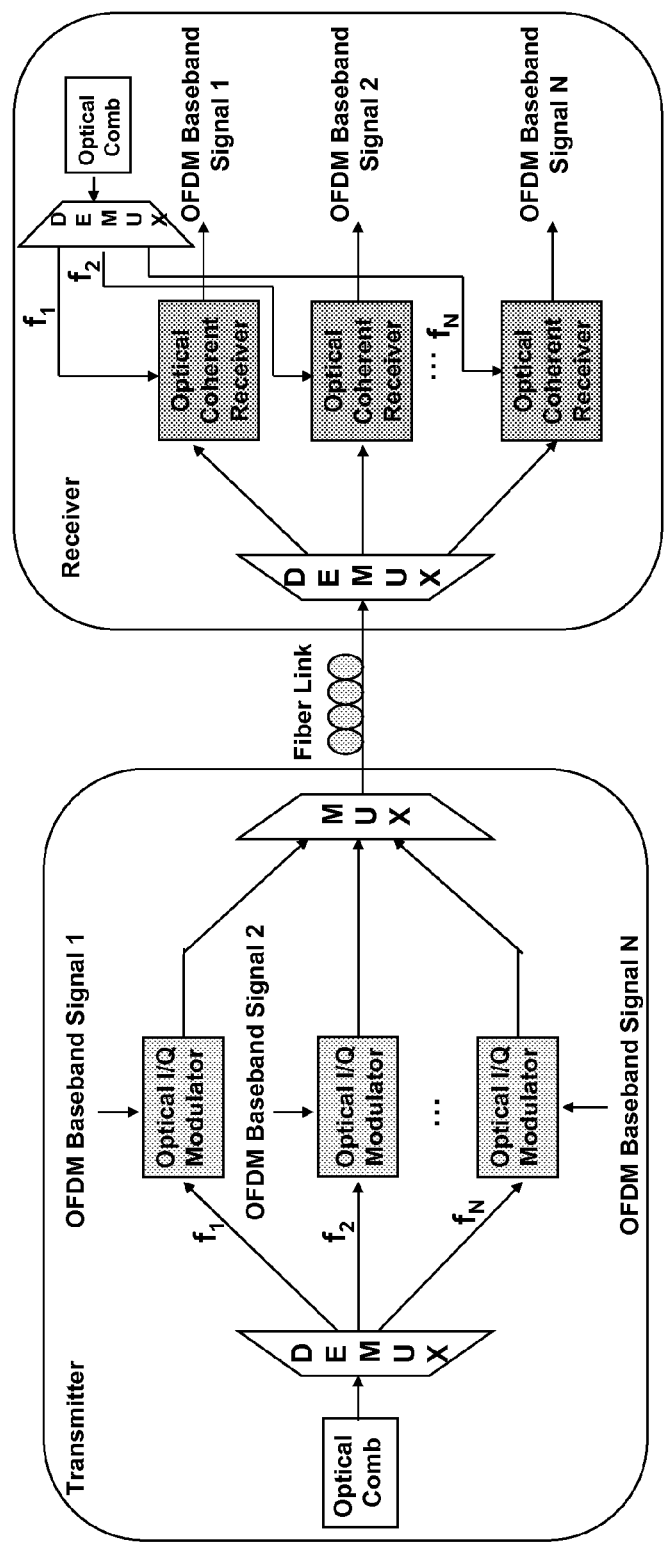
FIG. 14 shows an example apparatus used to demonstrate transmission of a 1 Tb/s O-OFDM signal.

The optical bandwidth required for 1 Tb/s transmission is about 340 GHz, dependent on the system design, which is about 170 GHz of electrical bandwidth. FIG. 14 shows a diagram of one example implementation of a 1 Tb/s system.

An optical comb is de-multiplexed into tones ($f_1 \ldots f_n$) and each tone is modulated using an optical I/Q modulator driven by an OFDM baseband signal for each subband. The optical OFDM subband signals at the output of the optical IQ modulators are combined and launched into the fiber link. At the receiver, each OFDM subband are de-multiplexed optically and then each fed into respective separate optical coherent receivers. At the transmitter, the center frequencies of the individual OFDM bands are from the same frequency source, for instance, from the optical comb generator. In this case the OFDM subbands are frequency-locked with each other. The phase drift between each OFDM band is not important, and can be easily treated via phase and channel estimation.

Figure 15:
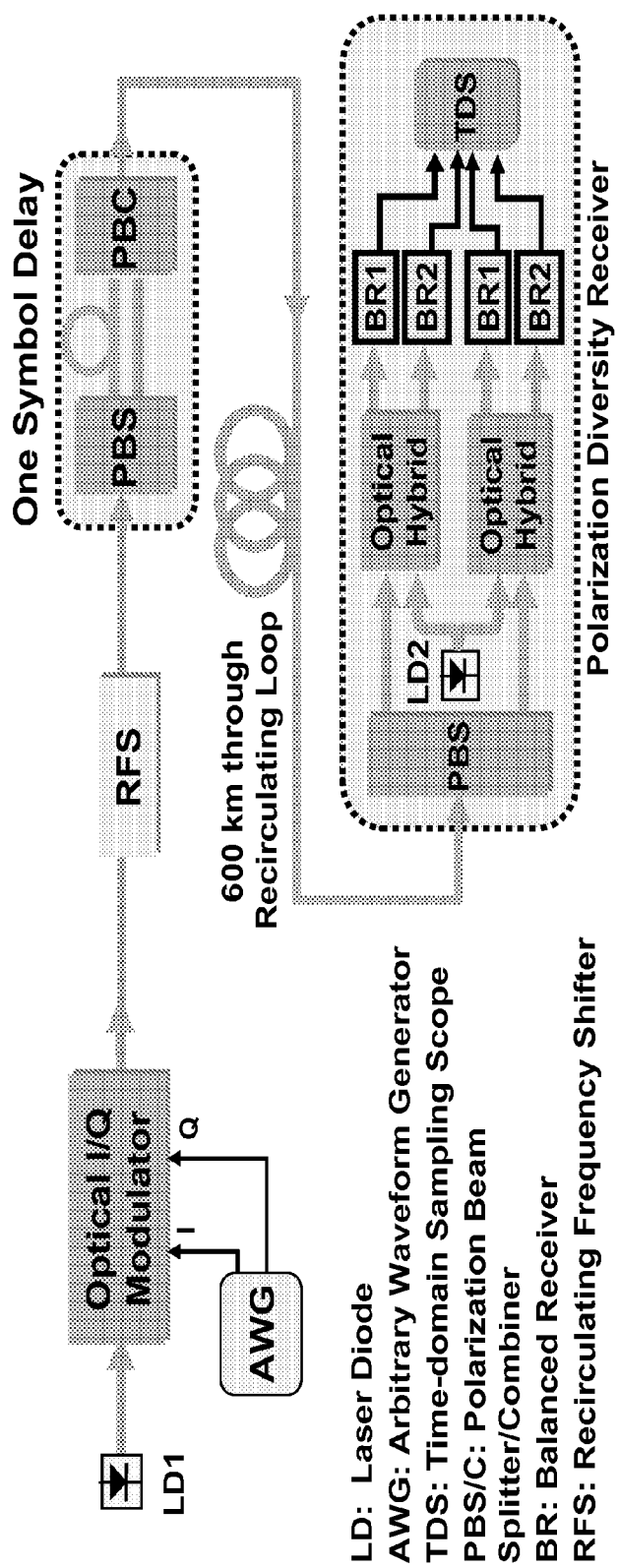
FIG. 15 shows an example transmission apparatus for a 1 Tb/s O-OFDM signal.

FIG. 15 shows one example of an experimental setup for the 1-Tb/s CO-OFDM system of FIG. 14. The optical sources for both the transmitters and local oscillators are commercially available Agilent™ lasers which have a linewidth of about 100 kHz. The first OFDM band signal is generated using a Tektronix Arbitrary Waveform Generator (AWG). The time domain OFDM waveform is generated with a MATLAB program with the parameters as follows: 128 total subcarriers; guard interval 1/8 of the observation period; middle 114 subcarriers filled out of 128, from which 4 pilot subcarriers are used for phase estimation. The real and imaginary parts of the OFDM waveforms are uploaded into the AWG operated at 10 GS/s to generate IQ analog signals, and subsequently fed into the I and Q ports of an optical IQ modulator respectively. The net data rate is 15 Gb/s excluding the cyclic prefix, pilot tones, and unused middle two subcarriers. The optical output from the optical IQ modulator is fed into a recirculating frequency shifter (RFS), replicated 36 times, and is subsequently expanded to a 36-band CO-OFDM signal with a data rate of 540 Gb/s. The RFS comprises a loop comprising an optical I/Q modulator which acts as a frequency shifter, EDFA, bandpass filter, and another EDFA. A coupler before the I/Q modulator allows the launch of a single tone into the RFS and another coupler before the bandpass filter couples an output of many tones from the loop. The optical OFDM signal from the RFS is then inserted into a polarization beam splitter, with one branch delayed by one OFDM symbol period (14.4 ns) to emulate the polarization multiplexing, and then recombined with a polarization beam combiner, resulting in a net date rate of 1.08 Tb/s.

Figure 16:
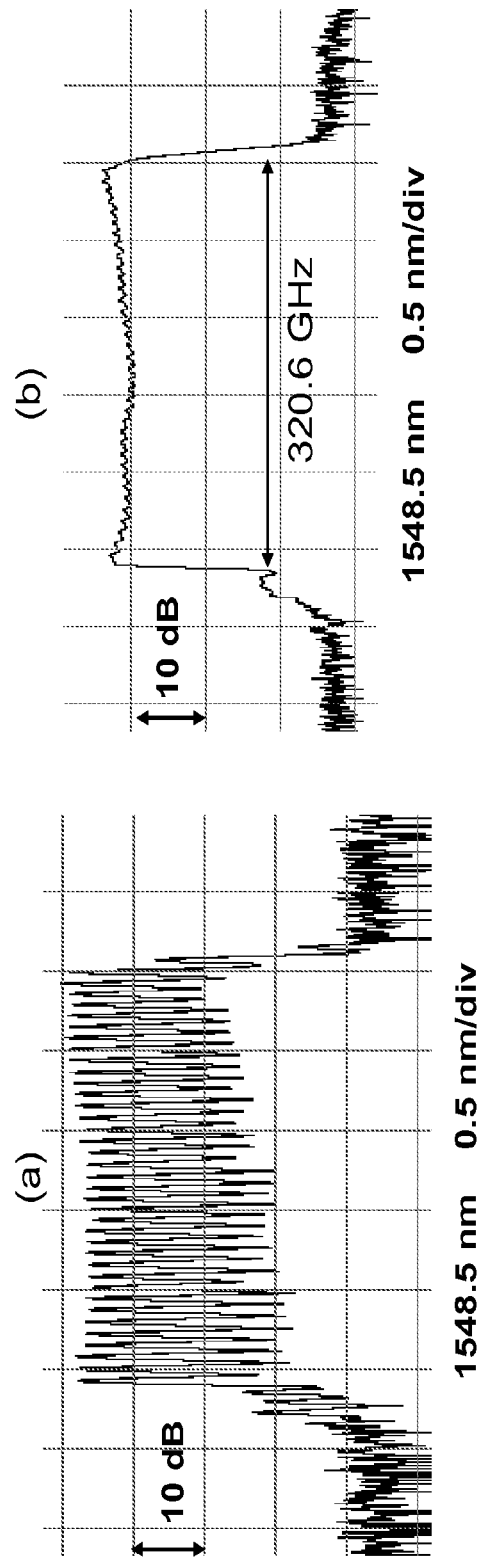
FIG. 16 shows (a) a spectrum of a multi-tone generated with the optical IQ modulator bypassed, and (b) a 1.08 Tb/s spectrum.

FIG. 16(a) shows a spectrum of the multi-tone generated if the optical IQ modulation in FIG. 15 is bypassed. It shows a successful 36-tone generation with the tone-to-noise ratio (TNR) of better than 20 dB with a resolution of 0.02 nm. The number of tones is controlled by the bandwidth of the optical bandpass filter in the RFS loop, and the RF tone frequency is 8.90625 GHz, phase-locked with the AWG using a 10 MHz reference clock. This is to ensure that all the subcarriers across the entire OFDM spectrum are at the correct uniform frequency grids. The tone frequency of 8.90625 GHz provides no frequency guard band between sub-bands. This satisfies the orthogonal-band condition. FIG. 16(b) shows the optical spectrum of the 1.08 Tb/s signal spanning 320.6 GHz in bandwidth consisting of 4,104 continuous spectrally-overlapped subcarriers, implying a spectral efficiency of 3.3 bit/s/Hz. The signal is then coupled into a recirculation loop comprising 100-km standard single mode fiber (SSMF) and a two-stage EDFA to compensate for the loss. The signal is coupled out from the loop and received with a polarization diversity detector (also known by some as a receiver) comprising a polarization beam splitter, two optical hybrids and four balanced receivers. The performance is detected on a per-band basis by aligning the local laser to the center of each band, and the detected RF signal is anti-alias filtered with a 7-GHz low-pass filter. The four RF signals for the two IQ components are then input into a Tektronix Time Domain-sampling Scope (TDS) and are acquired at 20 GS/s and processed with a MATLAB program using a 2×2 MIMO-OFDM model. The 2×2 MIMO-OFDM signal processing involves (1) FFT window synchronization using Schmidl format to identify the start of the OFDM frame, (2) software estimation and compensation of the frequency offset, (3) channel estimation in terms of Jones vectors and Jones Matrices, (4) phase estimation for each OFDM symbol, and (5) constellation construction for each carrier and BER computation. The channel matrix is estimated by sending 20 OFDM symbols using alternative polarization launches. Fewer pilot symbols can be used by exploring intra-symbol frequency correlation. The per-band detection of an OFDM signal enables the sub-wavelength bandwidth access with a cost-effective receiver by a node where 1-Tb/s bandwidth is not needed. This fractional bandwidth access is difficult to perform for OTDM-based Tb/s systems. This is because to access each OTDM tributary, meticulous dispersion compensation across broad bandwidth of the Tb/s signal, or a full set of Tb/s receiver is called for.

Figure 17:
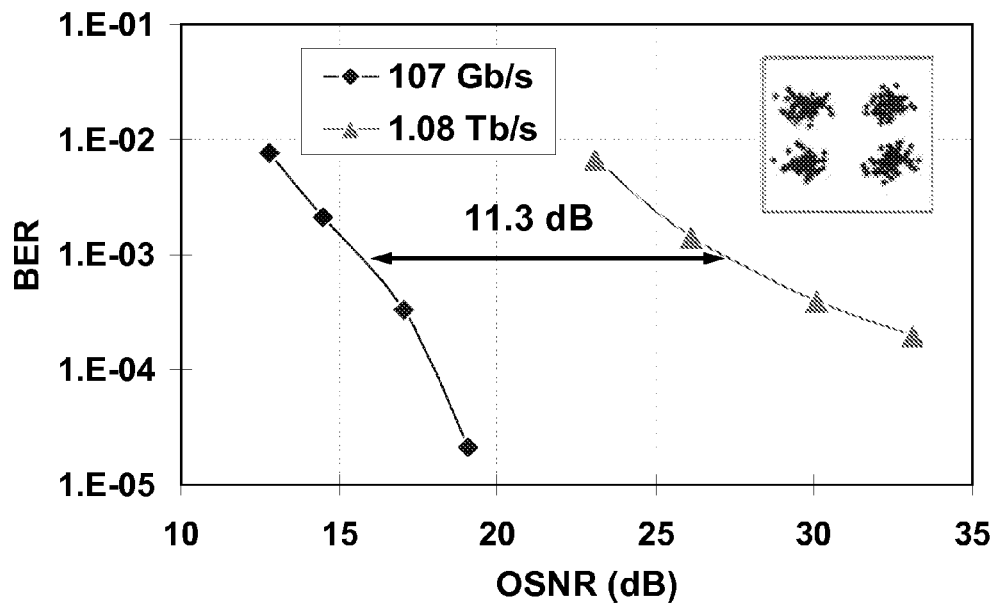
FIG. 17 shows back-to-back OSNR sensitivity for a 1 Tb/s signal and a 107 Gb/s signal.
Figure 18:
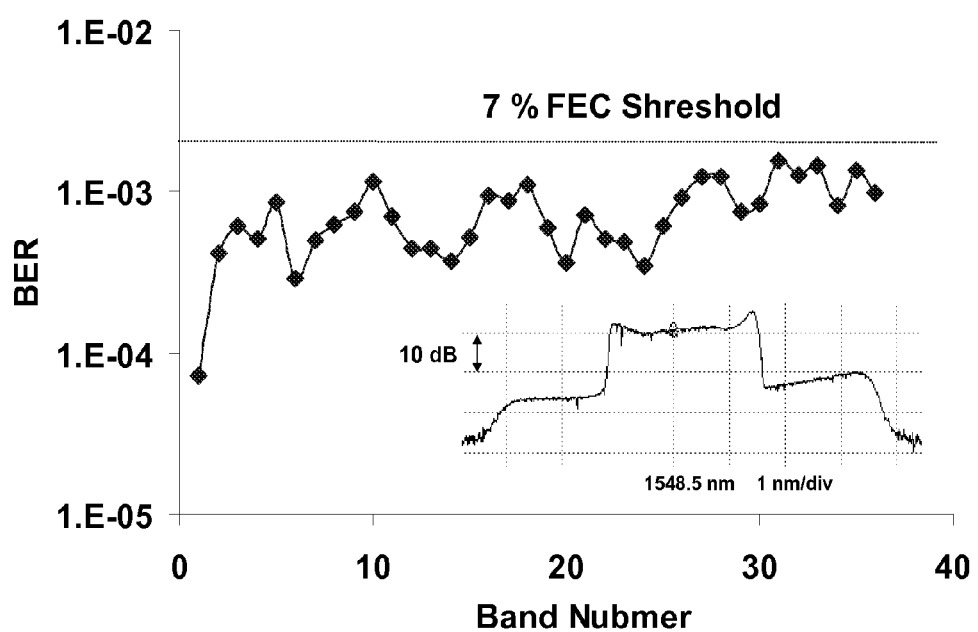
FIG. 18 shows the BER performance for individual OFDM sub-bands at 600 km. The inset shows the optical spectrum of the 1 Tb/s signal after 600 km transmission.

FIG. 17 shows the back-to-back BER sensitivity performance for the entire 1.08 Tb/s signal. The OSNR required for a BER of $10^{-3}$ is 27.0 dB, which is about 11.3 dB higher than a 107 Gb/s signal. The inset shows the typical constellation diagram for the detected CO-OFDM signal. The additional OSNR penalty is attributed to the degraded tone-to-noise ratio (TNR) at the right-edge of the signal spectrum shown in FIG. 16(a). FIG. 18 shows the BER performance for all 36 bands after 600 km with a launch power of 7.5 dBm. All of the bands achieve a BER better than $2 \times 10^{-3}$, the FEC threshold with 7% overhead. The inset shows the 1-Tb/s optical signal spectrum after 600-km transmission. The reach performance for this 1-Tb/s transmission is limited by two factors: (i) the noise accumulation by the edge subcarriers that have been generated by the most frequency shifting, and (ii) the two-stage amplifier which exhibits a noise figure of over 9 dB, because of the difficulty of tilt control in the recirculation loop. Both issues may be overcome, and greater than 1000 km of transmission at 1-Tb/s may be reached.

In summary, the 1-Tb/s signal with a spectral efficiency of 3.3 bit/s/Hz was successfully received after transmission over 600-km SSMF fiber without either Raman amplification or dispersion compensation.

Fundamentals of O-OFDM

Some further details of embodiments of the method embodiments and apparatus will now be described. For simplicity the generation of a signal with a single band is discussed, but it will be appreciated that the principles can be extended to generating signals with a band structure as previously described.

Principle of Orthogonal Frequency-Division Multiplexing (OFDM)

Figure 19:
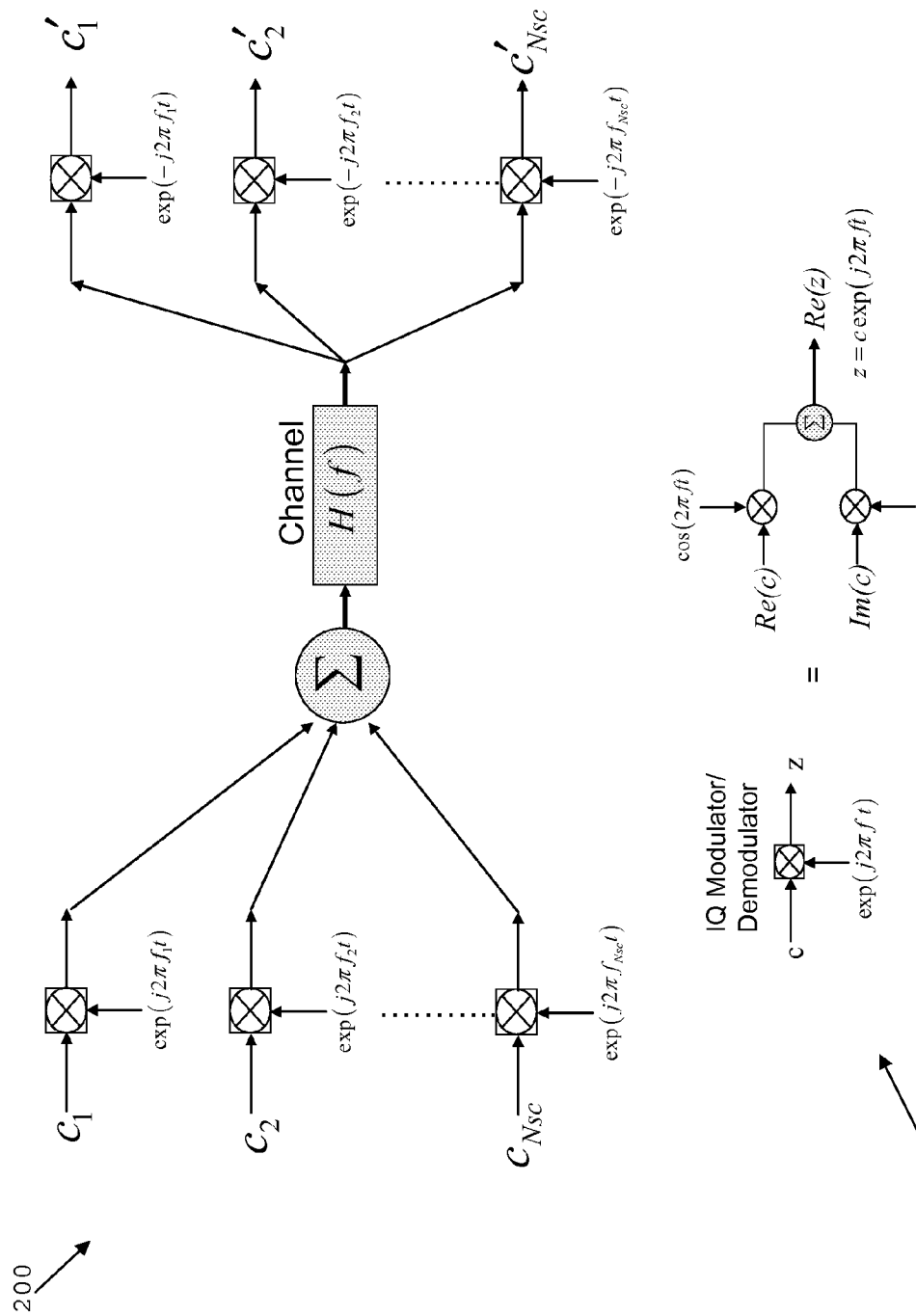
FIG. 19 shows a conceptual diagram for one example of a generic multi-carrier modulation (MCM) system.

OFDM is a special form of a broader class of multi-carrier modulation (MCM), an embodiment of an implementation of which is depicted in FIG. 14 and generally indicated by numeral 200. The structure of one embodiment of a complex mixer (IQ modulator/demodulator), which is commonly used in MCM systems, is also shown in the figure and generally indicated by numeral 202. The MCM transmitted signal s(t) is represented as $$s(t) = \sum_{i=-\infty}^{+\infty} \sum_{k=1}^{N_{sc}} c_{ki} s_k(t - iT_s) \qquad (3)$$

$$s_k(t) = \prod(t) \exp(j2\pi f_k t) \qquad (4)$$

$$\prod(t) = \begin{cases} 0, & (0 < t \le T_s) \\ 1, & (t \le 0, t > T_s) \end{cases} \qquad (5)$$

where $c_{ki}$ is the ith information symbol at the kth subcarrier, $s_k$ is the waveform for the kth subcarrier, Nsc is the number of subcarriers, $f_k$ is the frequency of the subcarrier, and $T_s$ is the symbol period. The detector for each subcarrier may use a filter that matches the subcarrier waveform, or a correlator matched to the subcarrier as shown in FIG. 19. Therefore, the detected information symbol $c'_{ik}$ at the output of the correlator is given by $$c'_{ki} = \int_0^{T_s} r(t - iT_s) s_k^* dt = \int_0^{T_s} r(t - iT_s) \exp(-j2\pi f_k t) dt \qquad (6)$$

where r(t) is the received time-domain signal. Orthogonality originates from the straightforward correlation between any two subcarriers, given by $$\delta_{ki} = \frac{1}{T_s} \int_0^{T_s} s_k s_l^* dt = \frac{1}{T_s} \int_0^{T_s} \exp(j2\pi(f_k - f_l)t) dt \qquad (7)$$
$$= \exp(j\pi(f_k - f_l)T_s) \frac{\sin(\pi(f_k - f_l)T_s)}{\pi(f_k - f_l)T_s}$$

It can be seen that if the following condition $$f_k - f_l = m \frac{1}{T_s} \qquad (8)$$

is satisfied, then the two subcarriers are orthogonal to each other. This signifies that these orthogonal subcarrier sets, with their frequencies spaced at multiple of inverse of the symbol rate (i.e. the symbol period) can be recovered with the matched filters (Eq. 6) without inter-carrier interference (ICI), in spite of strong signal spectral overlapping.

Figure 20:
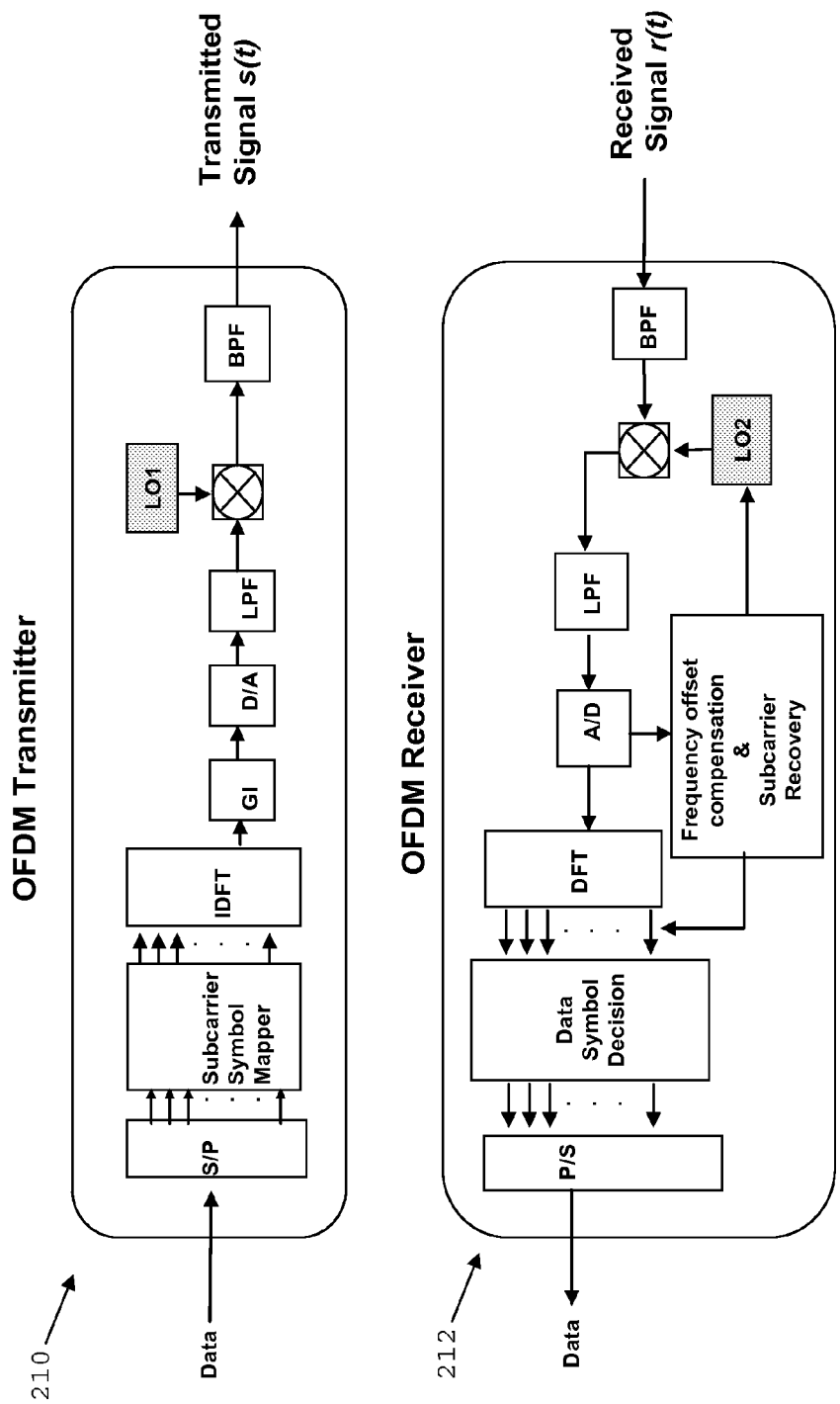
FIG. 20 shows a conceptual diagram for one embodiment of an OFDM transmitter and receiver.

A challenge with the OFDM is that a large number of subcarriers are needed so that the transmission channel affects each subcarrier as a flat channel. This leads to an extremely complex architecture involving many oscillators and filters at both transmit and receive end. OFDM modulation/demodulation may be implemented by using Inverse Discrete Fourier Transform (IDFT)/Discrete Fourier Transform (DFT). This is evident by studying OFDM modulation (Eq. 3) and OFDM demodulation (Eq. 6). It follows that the modulation can be performed by IDFT of the input information symbol $c_{ki}$, and the demodulation by DFT of the sampled received signal r(t). The corresponding architecture using DFT/IDFT and digital-to-analog/analog-to-digital converter (DAC/ADC) are shown in FIG. 20. Embodiments of an OFDM transmitter and OFDM receiver are shown and generally indicated by numerals 210 and 212 respectively. At the transmit end, the input data bits are mapped onto corresponding information symbols of the subcarriers within one OFDM symbol, and the digital time domain signal is obtained by using IDFT, which is subsequently inserted with guard interval and converted into real time waveform through DAC. The guard interval is inserted to prevent inter-symbol-interference (ISI) due to channel dispersion. The baseband signal can be up-converted to an appropriate RF band with an IQ mixer/modulator. At the receive end, the OFDM signal is first down-converted to baseband with an IQ demodulator, and sampled with an ADC, and demodulated by performing DFT and baseband signal processing to recover the data.

A cyclic prefix may be inserted. Let us first consider two consecutive OFDM symbols that undergo a dispersive channel with a delay spread of $t_d$. For simplicity, each OFDM symbol includes only two subcarriers with the fast delay and slow delay differenced at $t_d$, represented by 'fast subcarrier' and 'slow subcarrier', respectively. FIG. 21(a) shows that inside each OFDM symbol, the two subcarriers, 'fast subcarrier' and 'slow subcarrier' are aligned upon the transmission. FIG. 21(b) shows the same OFDM signals upon the reception where the 'slow carrier' is delayed by $t_d$ against the 'fast carrier'. We select a DFT window containing a complete OFDM symbol for the 'fast subcarrier'. It is apparent that due to the channel dispersion, the 'slow subcarrier' has crossed the symbol boundary leading to the interference between neighboring OFDM symbols, formally, the inter-symbol-interference (ISI). Furthermore, because the OFDM waveform in the DFT window for 'slow subcarrier' is incomplete, the critical orthogonality for the subcarriers is lost, resulting in an inter-carrier-interference (ICI) penalty.

Figure 21:
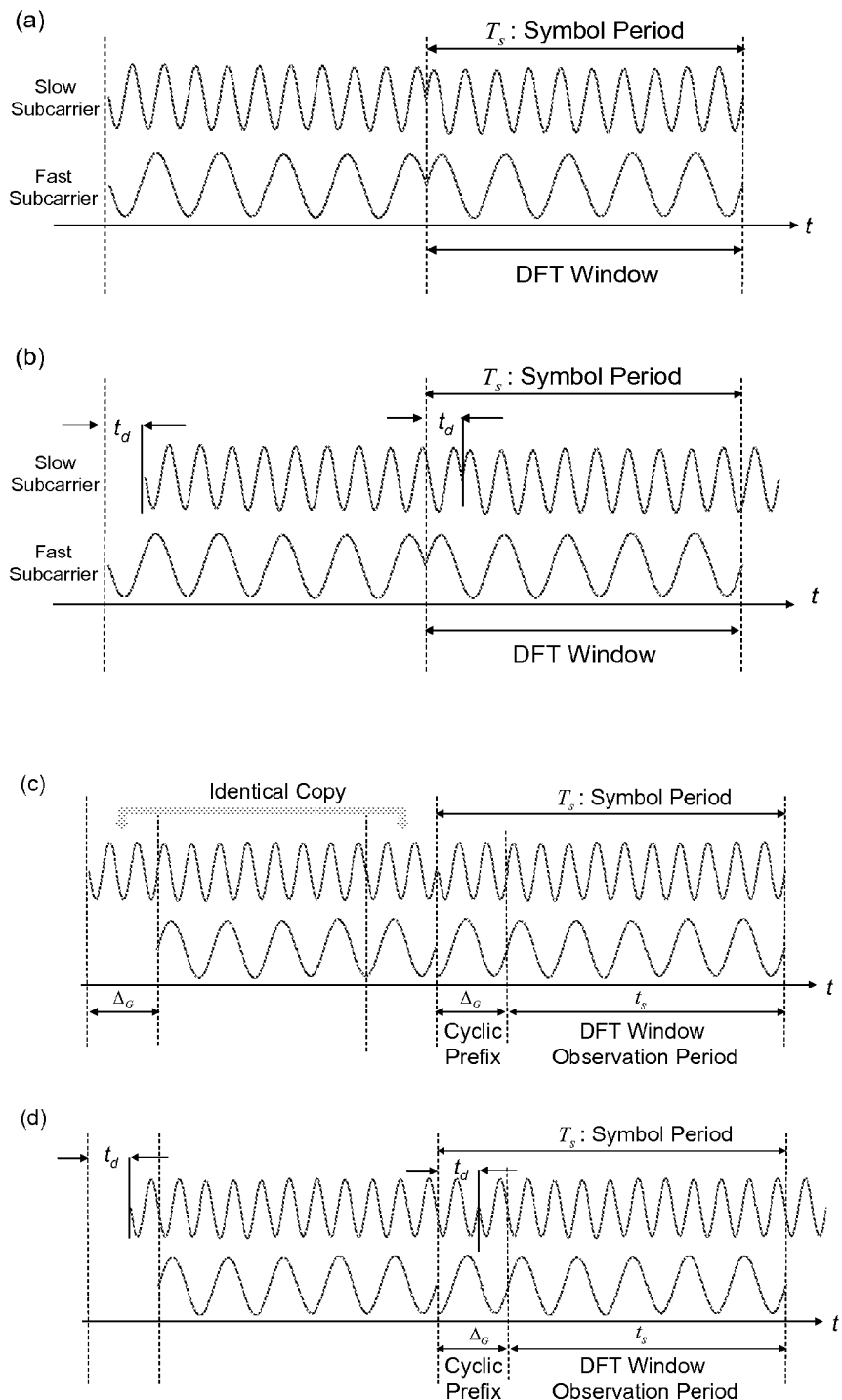
FIG. 21 shows examples of OFDM signals (a) without cyclic prefix at the transmitter, (b) without cyclic prefix of the receiver, (c) with cyclic prefix at the transmitter, and (d) with cyclic prefix at the receiver.

FIG. 21 shows examples of OFDM signals (a) without a cyclic prefix at the transmitter, and (b) without a cyclic prefix of the receiver. Signals without a cyclic prefix may be advantageous because a large cyclic prefix results in excessive OFDM symbol or block length, which is sensitive to phase noise and may consume more resource in a CMOS implementation, especially above 100 Gb/s.

Cyclic prefix may resolve the channel dispersion induced ISI and ICI. FIG. 21(c) shows insertion of a cyclic prefix by cyclic extension of the OFDM waveform into the guard interval, $\Delta_G$. As shown in FIG. 21(c), the waveform in the guard interval is essentially an identical copy of that in the DFT window, with time-shifted by 'ts' behind. FIG. 21(d) shows the OFDM signal with the guard interval upon reception. Let us assume that the signal has traversed the same dispersive channel, and the same DFT window is selected containing a complete OFDM symbol for the 'fast subcarrier' waveform. It can be seen from FIG. 21(d), a complete OFDM symbol for 'slow subcarrier' is also maintained in the DFT window, because a proportion of the cyclic prefix has moved into the DFT window to replace the identical part that has shifted out. As such, the OFDM symbol for 'slow subcarrier' is an 'almost' identical copy of the transmitted waveform with an additional phase shift. This phase shift is dealt with through channel estimation and will be subsequently removed for symbol decision. Now we arrive at the important condition for ISI-free OFDM transmission, given by $$t_d < \Delta_G \qquad (9)$$

It can be seen that to recover the OFDM information symbol properly, there are two critical procedures that need to be carried out, (i) selection of an appropriate DFT window, called DFT window synchronization, and (ii) estimation of the phase shift for each subcarrier, called channel estimation or subcarrier recovery.

Principle of Optical OFDM

An embodiment of an optical OFDM system can be divided into five functional blocks including (i) the RF OFDM transmitter, (ii) the RF-to-optical (RTO) up-converter, (iii) the optical channel, (iv) the optical-to-RF (OTR)

down-converter, and (v) the RF OFDM receiver. The detailed architecture for the RF OFDM transmitter/receiver has been shown in FIG. 19, which generates/recovers the OFDM signals either in baseband or RF band.

Up/Down Conversion Design Options for O-OFDM Systems

Figure 23:
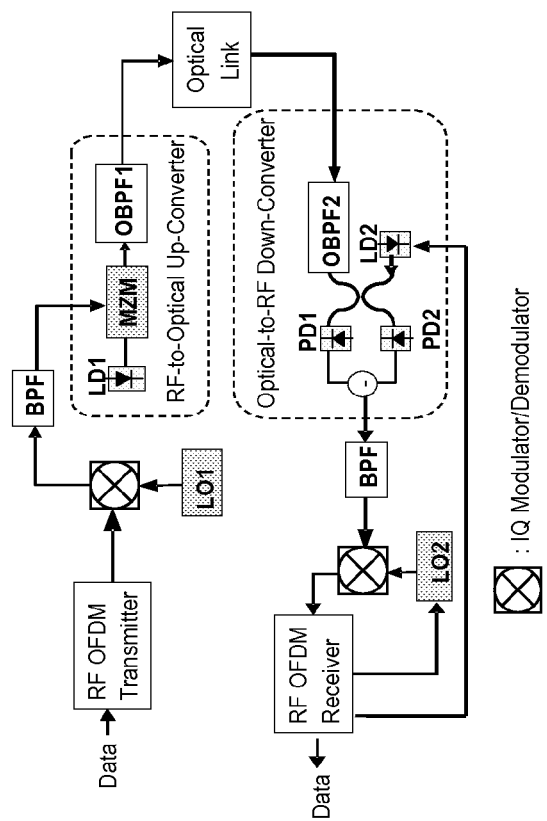
FIGS. 22 and 23 shows example O-OFDM systems in direct up/down conversion and intermediate frequency architecture respectively.
Figure 22:
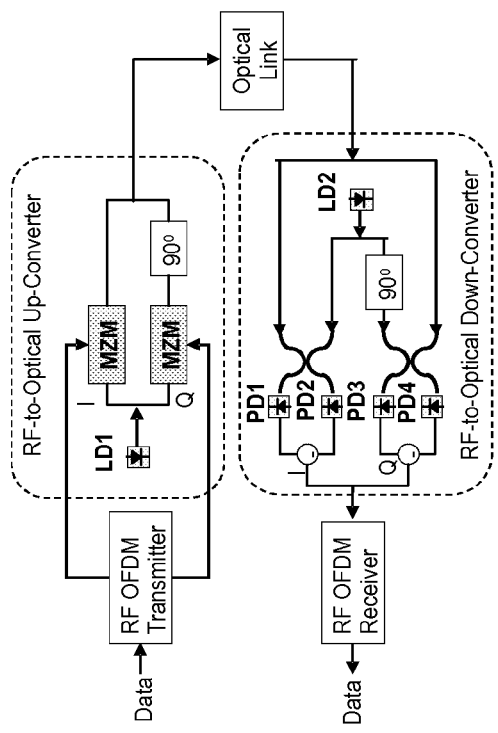

FIGS. 22 and 23 show respectively embodiments of O-OFDM systems which use direct up/down conversion architecture and intermediate frequency (IF) architecture. In the direct up-conversion architecture (FIG. 22), the optical transmitter uses an optical I/Q modulator which comprises two MZMs to up convert the real/imaginary parts of the s(t) [(Eq. 3], from the RF domain to the optical domain, i.e., each MZM is respectively driven by the real or imaginary part of the s(t). In the direct down-conversion architecture, the OFDM optical receiver uses two pairs of balanced receivers and an optical 90° hybrid to perform optical I/Q detection. The RF OFDM receiver performs OFDM base-band processing to recover the data. The advantages for such a direct-conversion architecture are (i) elimination of a need for image rejection filter in both transmitter and receiver, and (ii) significant reduction of the required electrical bandwidth for both transmitter and receiver. In the intermediate frequency (IF) up-conversion architecture, the OFDM base-band signal is first up-converted to an intermediate frequency $f_{LO1}$ in electrical domain, and the OFDM IF signal is further up-converted to optical domain with one MZM. In the IF down-conversion system, the optical OFDM signal is first down-converted to an intermediate frequency $f_{LO2}$ and the electrical I/Q detection is performed.

Since the transmitter can be direct or IF up-conversion architecture, and the receiver can be direct or IF down-conversion architecture, there are four design choices for a O-OFDM system (only two are shown FIGS. 22 and 23). Furthermore, at the receive end, direct down-conversion is synonymous with homodyne detection, and IF down-conversion is synonymous with heterodyne detection. However, the terms of direct-conversion and IF transmitter/receiver are already widely-accepted OFDM terminologies, and thus have been adopted here to encompass the architectures at both transmit and receive ends.

Multiple-Baseband Up-Conversion and Multiplexing at the Transmitter.

Up conversion of the base band signals and combining them at the transmitter end (or down-conversion and demultiplexing at the receiver end) may be performed digitally. The following is one example of how the signal processing may be done.

In one approach, an inverse digital Fourier transform (IDFT) of a band-mapped frequency-domain signal is deployed.

Figure 24:
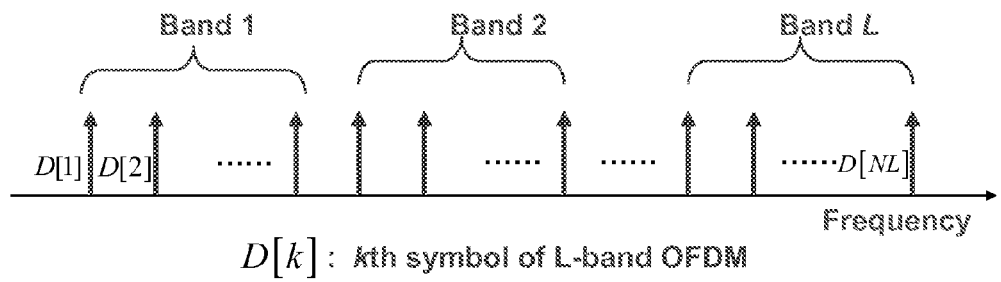
FIG. 24 shows a representation of an example L-band OFDM signal.
Figure 25:
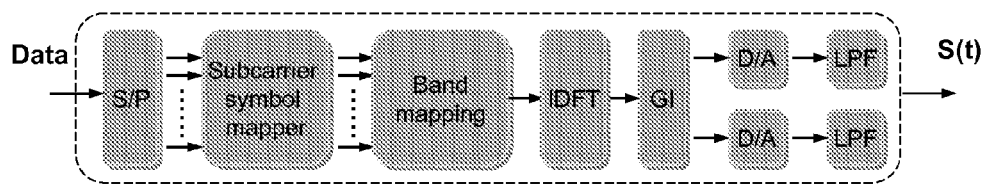
FIG. 25 shows an example block diagram of a processor for digital up conversion and multiplexing of multiple OFDM base bands.

As shown in FIG. 24, each baseband OFDM symbol is first mapped onto a continuous segment of OFDM spectrum. Formally, $$D[k]=c_i[k-iN_b], k=0, 2, \ldots LN-1, i=0, 2, \ldots L-1 \quad (10)$$

where $D_k$ is the kth element for the composite vector D, $c_i[j]$ is the jth element of the ith OFDM subband in frequency-domain, $N_b$ is the number of subcarriers per subband, and L is the number of subbands. One example of the signal processing is shown in FIG. 25. The multiple subbands are mapped into one super vector D, which then undergoes IDFT, and the time-domain digital signal would be $$S[m]=IDFT(D_k) \quad (11)$$

The inserted guard interval in such a scheme only needs to cover the dispersion per subband, which in some circumstances is more advantageous than covering the dispersion over the entire spectrum.

Figure 26:
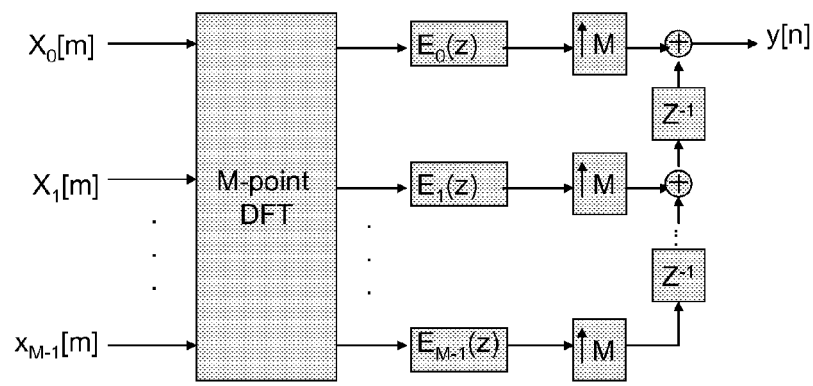
FIG. 26 shows an example chart of digital up conversion and multiplexing of multiple subbands using a uniformly modulated filter bank.

In another approach, a uniformly modulated DFT filterbank is used. The up conversion and multiplexing of multiple OFDM bands may be performed using one or more classical uniformly modulated DFT filterbanks. As shown in FIG. 26, $x_i[m]$ is the mth sample in the ith subband in the time-domain; y[n] consists up converted multiple subbands signal. The prototype filter in z-transform for each subband is expressed as $$H_0(z) = \sum_{i=0}^{M-1} z^{-i} E_i(z^M) \quad (12)$$

FIG. 26 shows one example of a polyphase implementation of decomposition and up sampling of the overall transfer function.

Figure 27:
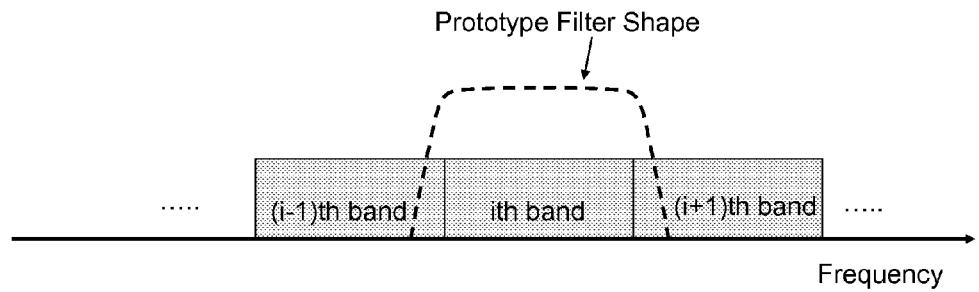
FIG. 27 shows an example filter shape for a subband.

The detailed filter shape is not critical, but may advantageously have the following general features: (i) the passband should be as flat as possible to pass the subband signals undistorted, (ii) the transmission should attenuate quickly, preferably within 10-20% of the passband. A raised Cosine filter may be used. The prototype filter in relation to ith subband is shown in FIG. 27.

Digital Multiple-Baseband Down-Conversion and Demultiplexing at the Receiver.

Figure 28:
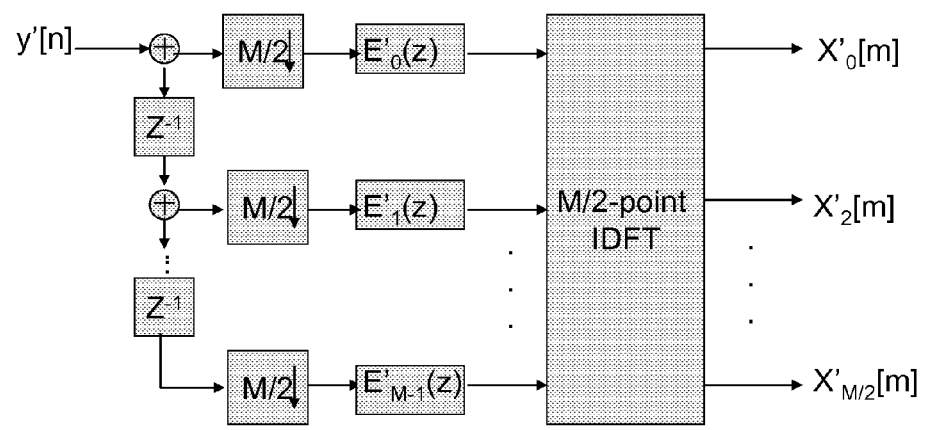
FIG. 28 shows an example chart of down conversion and demultiplexing of an even number of subbands using a uniformly modulated filterbank

At the receiver end, using the inverse of the digital fourier transform approach of the transmit end may not be effective because of dispersion during transmission. However, using an inverse uniformly demodulated DFT filterbank may be very effective. However, to avoid the aliasing, the demultiplexing is performed on even or odd basis. FIG. 28 shows the down conversion and demultiplexing of M/2 even number of subbands (subbands of 0, 2, ... M/2). y'[n] is the nth sample of the received signal, x'$_i$[m] is the demultiplexed subband signal in the time-domain. Similar to the transmitter end, the receiver prototype filter is given by $$H'_0(z) = \sum_{i=0}^{M-1} z^{-i} E'_i(z^M) \quad (13)$$

Similar to transmitter, the detailed filter shape is not critical, but may advantageously have the following general features: (i) the filter transmission, or pass, band may be as flat as possible, (ii) outside the passband the filter transmission may attenuate, quickly preferably within 10-20% of the passband. A raised Cosine filter may be used as the prototype filter. The prototype filter shape in relation to the ith subband may be similar to that shown in FIG. 27.

The odd number of the subbands can be obtained using exactly the same structure as FIG. 28, except that the input signal is shifted by one subband, that is, y'[n] is replaced with $$y'[n]\exp\left(j\frac{2\pi}{M}n\right).$$

Since y'[n] is only down-sampled M/2 times, each subband is twice oversampled. The useful frequency-domain OFDM symbols are obtained by performing a DFT of x'$_i$[m], and retaining only the middle portion of the $N_b$ OFDM symbols where $N_b$ is the number subcarriers per subband.

Now that embodiments have been described, it will be appreciated that some embodiments have some of the following advantages:

By dividing a signal into bands, the bandwidth requirements of the electronics, especially the DACs and ADCs, have been greatly reduced allowing the use of relatively slow electronics, ameliorating technical and economic problems associated with fast electronics.

No optical dispersion compensation and no amplification is required, at least for up to 100 Gb/s and 1000 km of transmission, even for standard single mode fiber.

Unlike all-optical OFDM, no precise bit synchronization between neighboring subcarriers at the receiver is necessary for OBM-OFDM. Because of the electronic OFDM processing in OBM-OFDM, there is no need for optical dispersion compensation.

The demonstrated spectral efficiency is relatively high.

It will be appreciated that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method comprising:
receiving one or more input digital signals;
generating from the one or more input digital signals a plurality of analog electrical baseband signals each comprising a plurality of subcarriers spaced apart by a subcarrier spacing frequency equal to an integer multiple of a symbol rate of the baseband signals; and
up-converting each of the baseband signals to a respective up-converted radio frequency (RF) band signal, the up-converted signals also being spaced apart by an integer multiple of the symbol rate;
combining the up-converted RF band signals; and
modulating a light source with the combined up-converted RF band signals.

2. A method defined by claim 1 wherein the up-converted signals are spaced apart by an integer multiple of the subcarrier spacing frequency.

3. A method defined by claim 1 wherein each of the plurality of analog electrical baseband signals is generated by a method comprising:
mapping one or more bits of the input digital signals to respective ones of a plurality of information symbols; and
modulating each one of the plurality of information symbols onto a corresponding subcarrier of one of the analog electrical baseband signals.

4. A method defined by claim 3 wherein modulating each one of the plurality of information symbols comprises:
generating a digital time domain signal by frequency-time transformation of the plurality of information symbols; and
converting the digital time domain signal to a corresponding analog electrical baseband signal.

5. A method defined by claim 4 further comprising inserting a guard interval into the digital time domain signal.

6. A method defined by claim 4 further comprising inserting a cyclic prefix into the digital time domain signal.

7. An apparatus comprising:
a baseband generator arranged to receive one or more input digital signals, and to generate from the one or more input digital signals a plurality of analog electrical baseband signals, each baseband signal comprising a plurality of subcarriers spaced apart by a subcarrier spacing frequency equal to an integer multiple of a symbol rate of the baseband signals;
an up-converter in communication with the baseband generator, the up-converter being arranged to receive and up-convert each baseband signal to a respective up-converted radio frequency (RF) band signal, the up-converted signals also being spaced apart by an integer multiple of the symbol rate;
an RF combiner arranged to combine the up-converted RF band signals; and
an optical modulator in communication with a light source and the RF combiner, the modulator being arranged to modulate the light source with the combined up-converter RF band signals.

8. An apparatus defined by claim 7 wherein the baseband generator comprises a plurality of baseband generators, each generator being arranged to generate a respective one of the baseband signals.

9. An apparatus defined by claim 8 wherein each of the baseband generators comprises an OFDM generator.

10. An apparatus defined by claim 7 wherein the up-converter comprises a plurality of up-converters.

11. An apparatus defined by claim 10 wherein each of the up-converters comprises an IQ modulator.

12. An apparatus defined by claim 7 wherein the baseband generator comprises:
a subcarrier symbol mapper arranged to map one or more bits of the input digital signals to respective ones of a plurality of information symbols, each corresponding with a subcarrier of one of the analog electrical baseband signals;
a frequency-time transformer arranged to generate a digital time domain signal from the plurality of information signals; and
a digital-to-analog converter arranged to convert the digital time domain signal to a corresponding analog electrical baseband signal.

13. A method comprising:
receiving a modulated optical signal comprising a plurality of mutually orthogonal subcarriers constituting a plurality of bands;
detecting the modulated optical signal to produce an electrical signal comprising a plurality of radio frequency (RF) band signals, wherein each RF band signal corresponds with one of the bands of the modulated optical signal;
down-converting one or more of the RF band signals to respective one or more analog electrical baseband signals; and
converting the one or more analog electrical baseband signals to corresponding digital signals; and
processing the digital signals to reconstruct transmitted information encoded in the modulated optical signal.

14. A method defined by claim 13 wherein processing each of the digital signals comprises processing each of the digital signals as for an OFDM baseband signal.

15. An apparatus comprising:
an optical receiver arranged to detect a modulated optical signal comprising a plurality of mutually orthogonal subcarriers constituting a plurality of bands and to produce an electrical signal comprising a plurality of radio frequency (RF) band signals, wherein each RF band signal corresponds with one of the bands of the modulated optical signal;

an RF down-converter arranged to down-convert one or more of the plurality of RF band signals to respective one or more analog electrical baseband signals;

one or more analog-to-digital converters arranged to convert the one or more analog electrical baseband signals to corresponding digital signals; and a processing module arranged to process each of the one or more digital signals to reconstruct transmitted information encoded in the modulated optical signal.

* * * * *